United States Patent [19]

Chedister et al.

[11] 3,848,981

[45] Nov. 19, 1974

[54] SELF-THREADING MOTION PICTURE PROJECTOR

[75] Inventors: Conkling Chedister, Barnegat, N.J.; Frank H. Beckman, New Britain, Conn.

[73] Assignee: Kalart Victor Corporation, Plainville, Conn.

[22] Filed: June 14, 1973

[21] Appl. No.: 370,015

[52] U.S. Cl. .............................. 352/157, 352/159
[51] Int. Cl. ........................................... G03b 1/56
[58] Field of Search ..................... 352/157, 158, 159

[56] References Cited
UNITED STATES PATENTS

| | | | |
|---|---|---|---|
| 1,973,477 | 9/1934 | Fritts | 352/157 |
| 3,119,300 | 1/1964 | Barocela | 352/157 X |
| 3,259,291 | 7/1966 | Maurer | 352/158 X |
| 3,426,950 | 2/1969 | Maurer | 352/158 X |
| 3,734,602 | 5/1973 | Deck | 352/157 |
| 3,737,220 | 6/1973 | Hickey | 352/159 |

*Primary Examiner*—Monroe H. Hayes
*Attorney, Agent, or Firm*—Hane, Baxley & Spiecens

[57] ABSTRACT

There is disclosed a motion picture projector with self-threading mechanism. The projector has in the front panel of its enclosure a slot into which is insertable a length of film extending between the two reels of the projector. The self-threading mechanism of the projector comprises a lever or arm which is pivotal from a loading position into a threading position, and vice versa. After dropping a length of film into the slot the lever is pivoted from its loading position into its threading position. While being so pivoted, the lever sequentially causes locking of the film to the take-up sprocket, then to the supply sprocket, then forming the lower loop, then the upper loop, and finally pressing the film into the film channel. The threading mechanism further comprises a control switch arm selectively settable from an OFF position either on forward or on reverse. Setting the control on forward causes wrapping of the film about the capstan of the projector and starts operating of the projector in a conventional manner. Setting of the switch arm on reverse with the pivotal lever in its threading position causes release of the film from the capstan and driving of the film through the projector in reverse direction. The reel constituting the supply reel during forward drive now functions as take-up reel and the reel functioning as take-up reel during forward drive now functions as supply reel. Fast rewind is effected by turning the pivotal lever into its loading position and setting the switch arm on reverse. Placement of the pivotal lever in its loading position releases the film from the sprockets so that the film can now be pulled through the projector at high speed. The mechanism also includes a slip clutch which brakes the reel acting as take-up reel during operation of the projector in the reverse mode and locks the take-up reel against slipping relative to the drive means during fast rewind.

14 Claims, 33 Drawing Figures

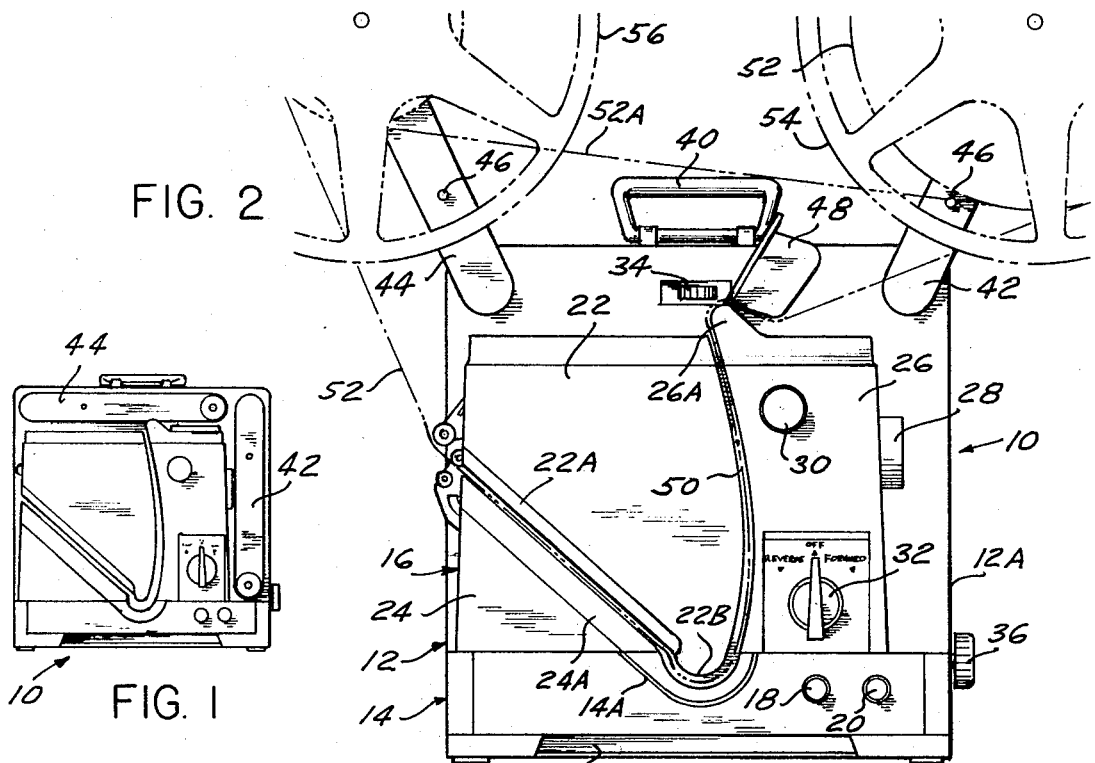
FIG. 1
FIG. 2
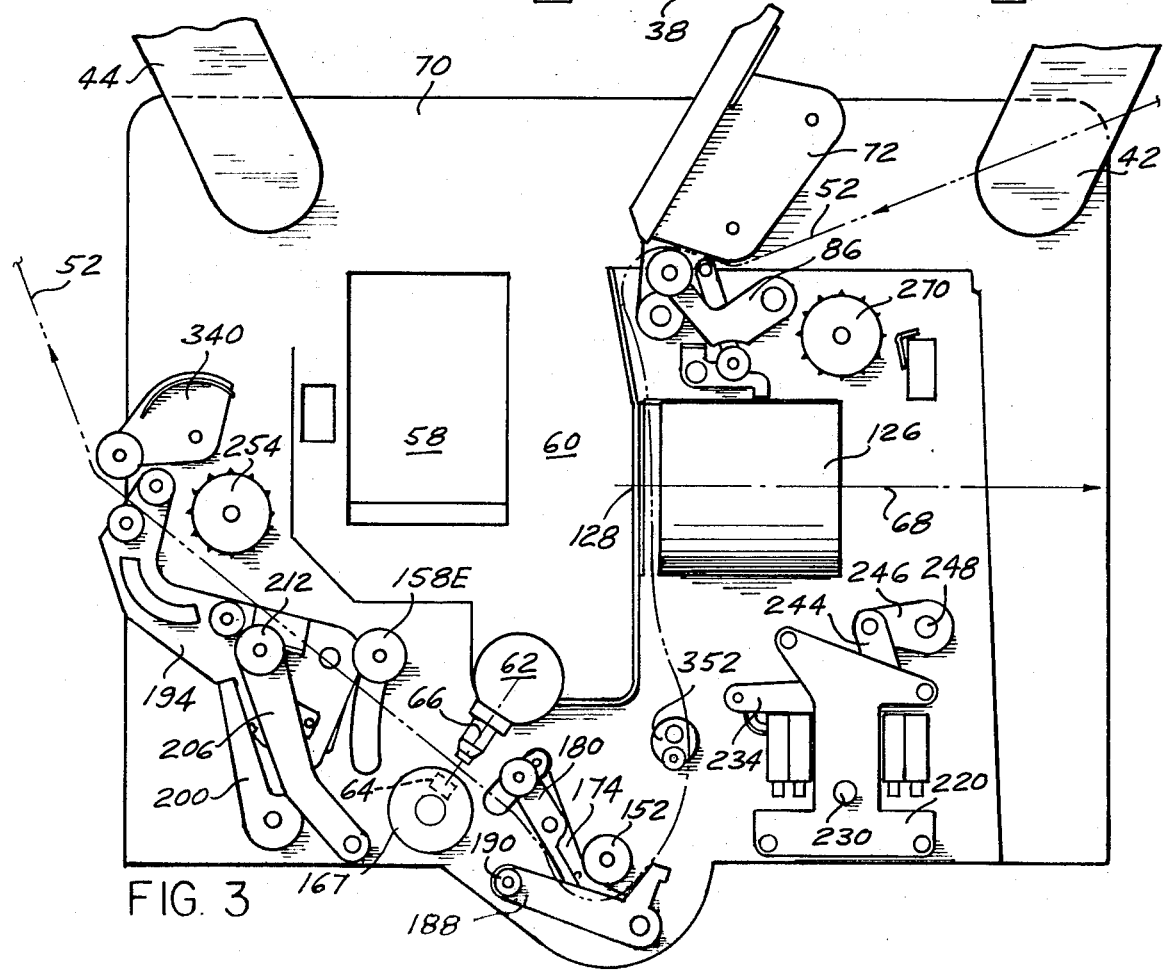
FIG. 3

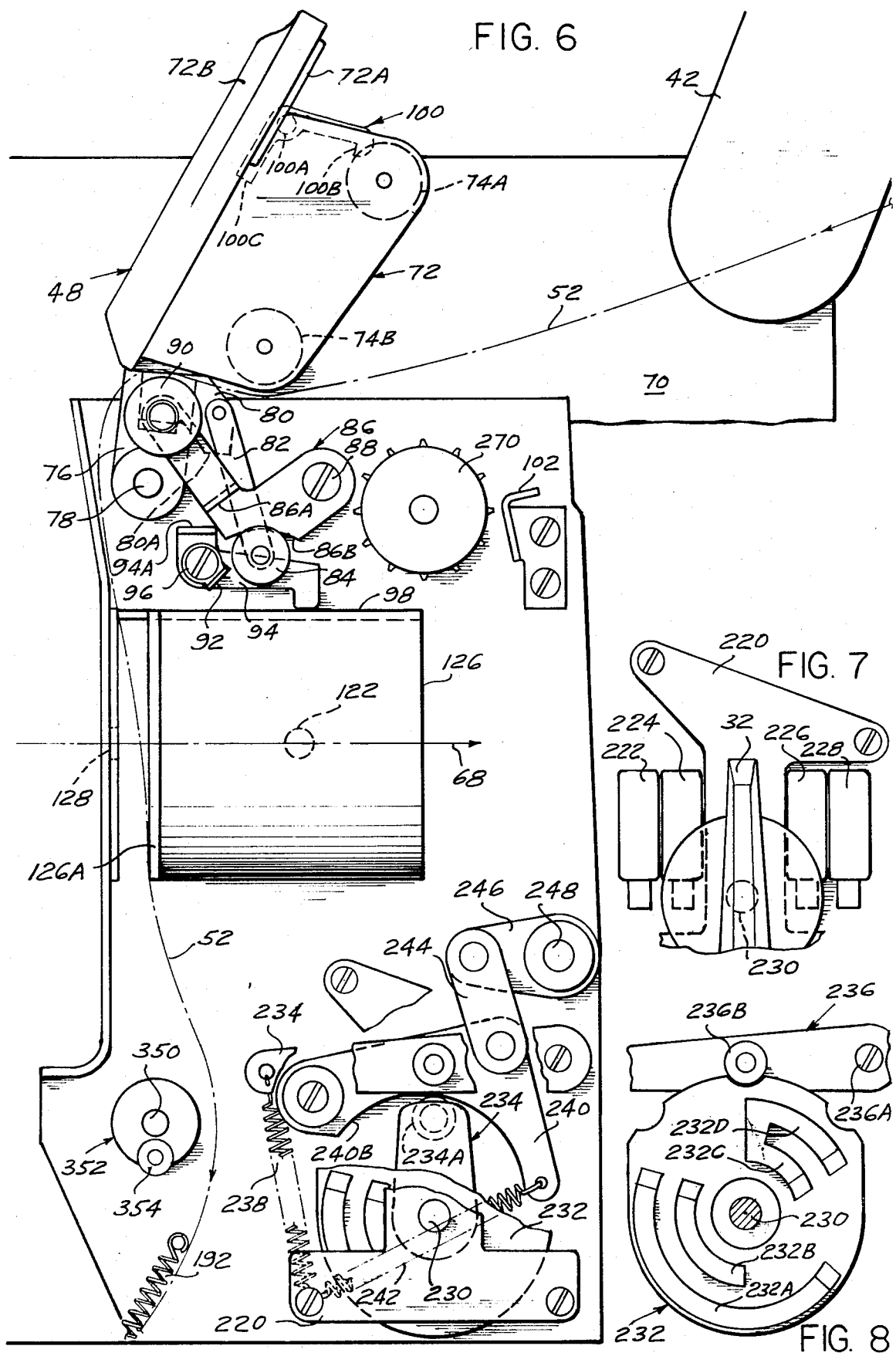

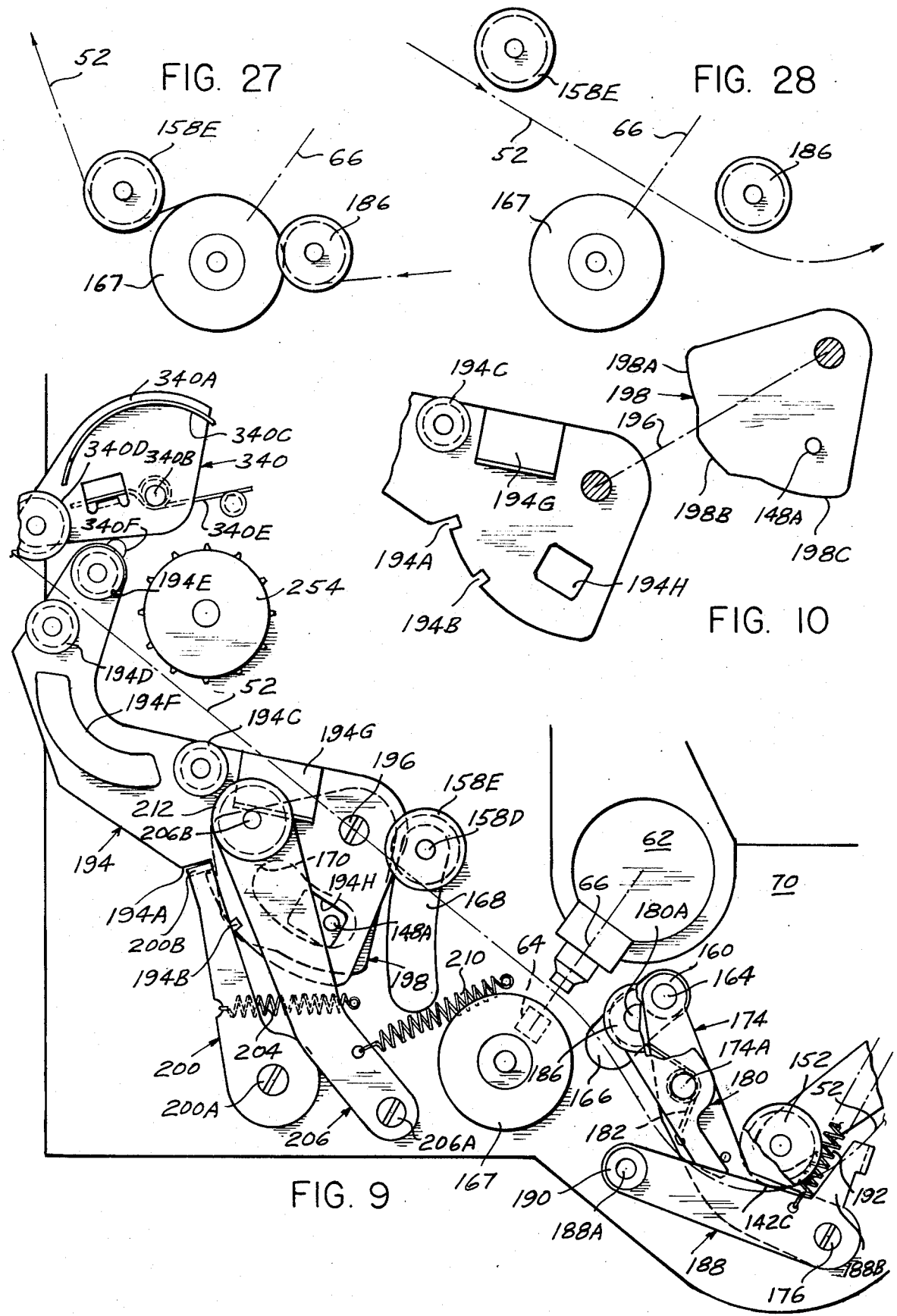

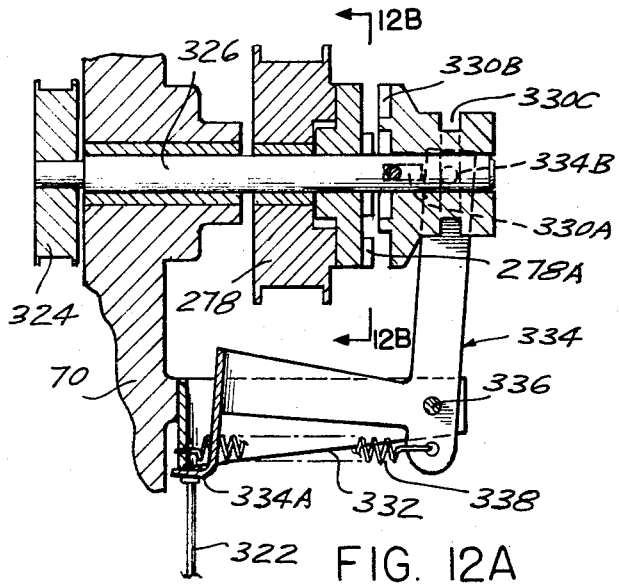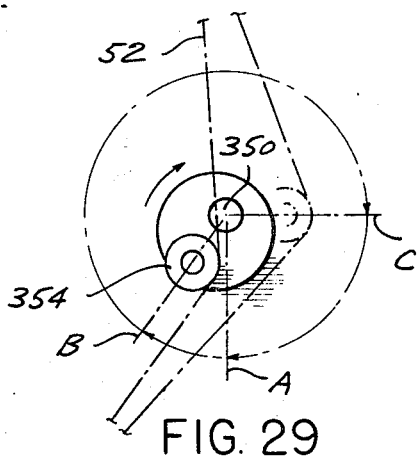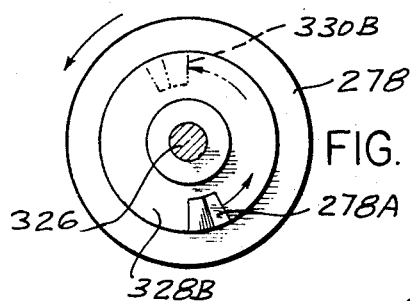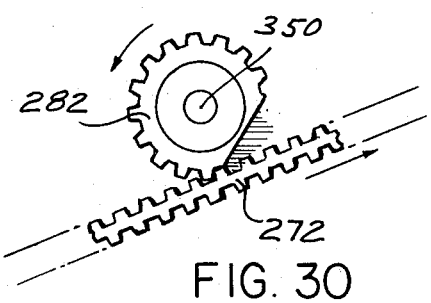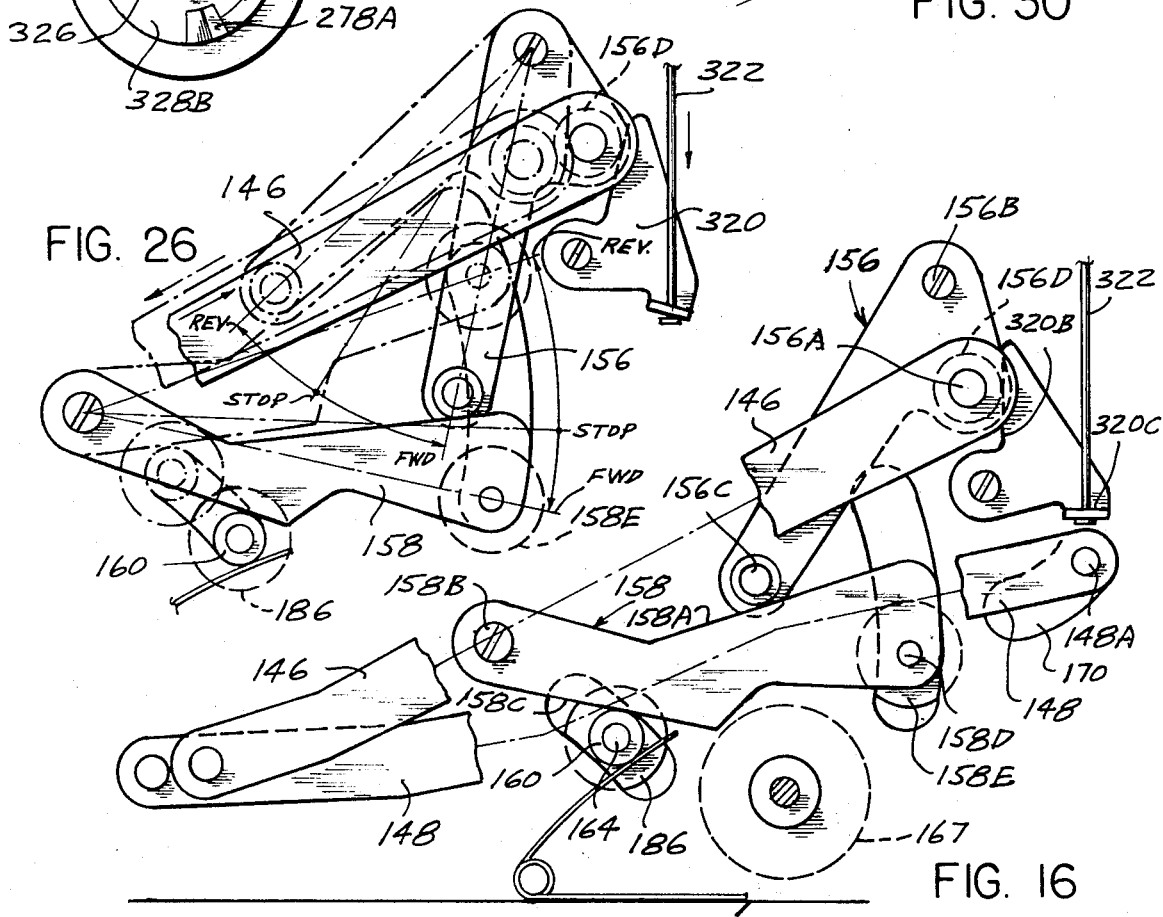

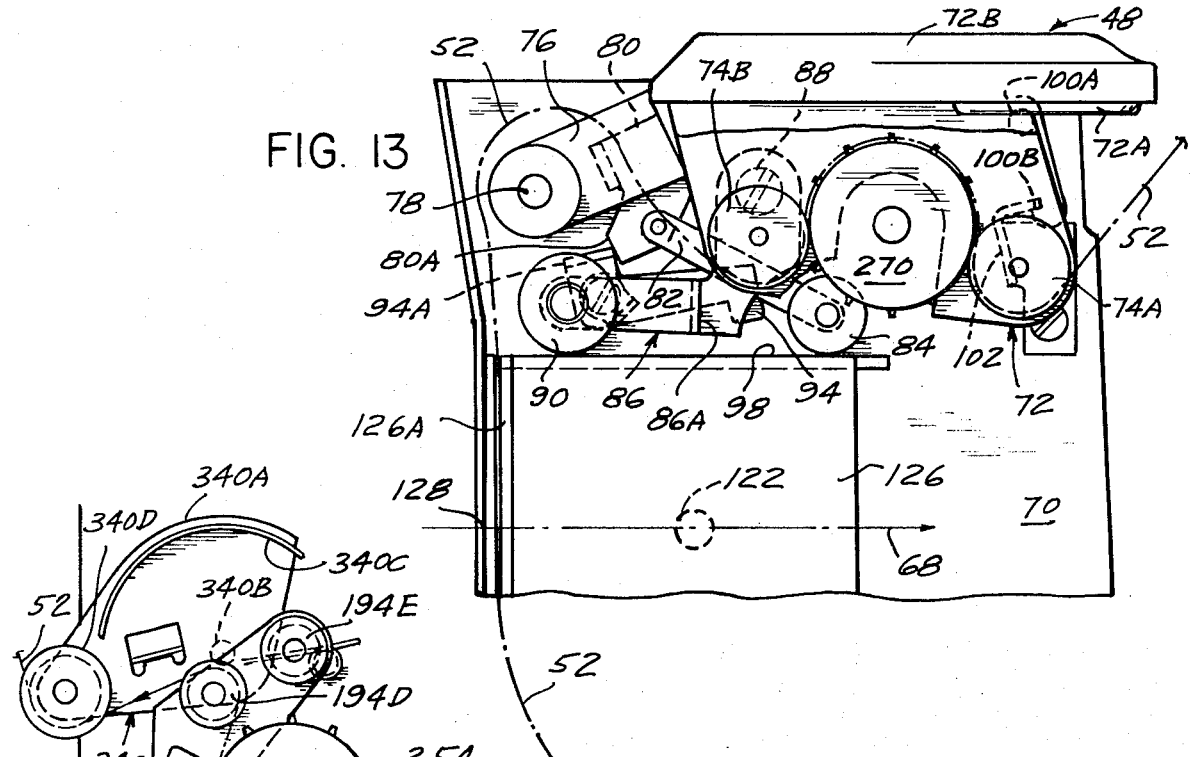
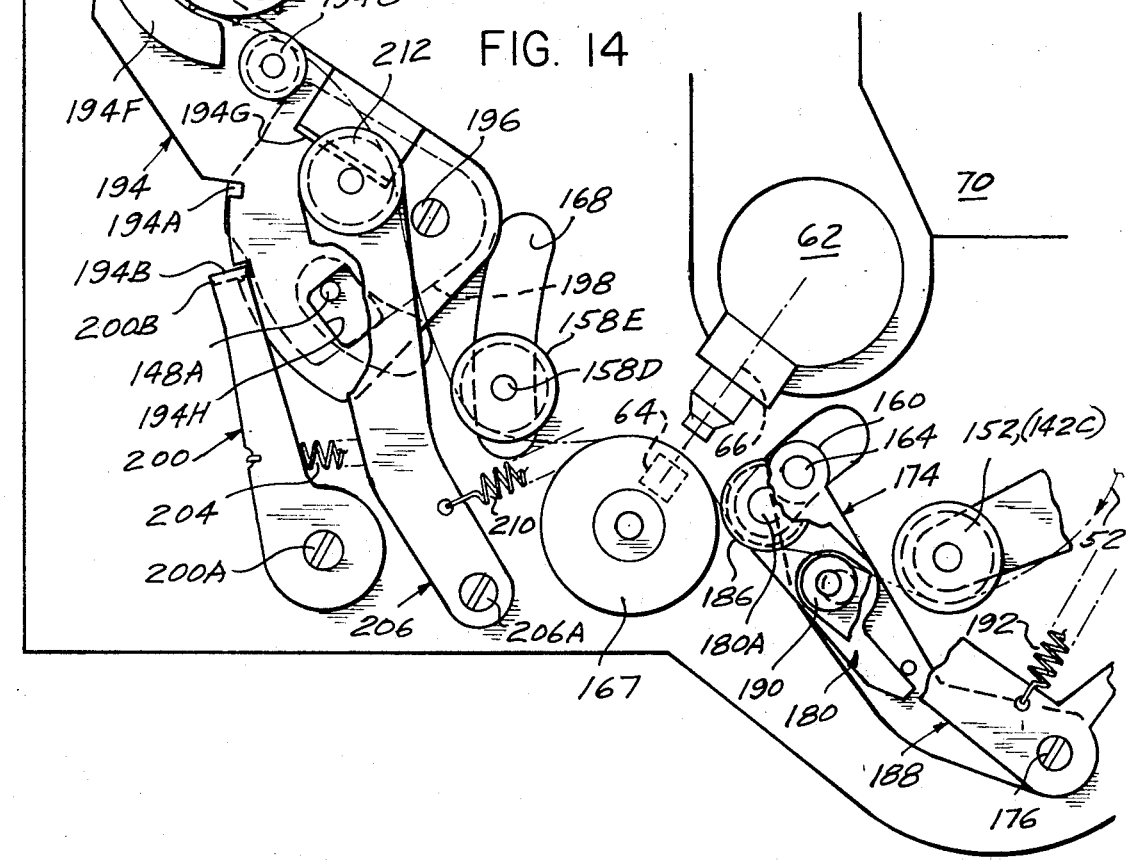

3,848,981

SELF-THREADING MOTION PICTURE PROJECTOR

The present invention relates to motion picture film projectors, either silent film projectors or sound film projectors, and more particularly to a film threading mechanism of such projectors.

BACKGROUND

With projectors as they are now widely used in the audio-visual field fo teaching and training purposes, and also for showing home movies, one of the regularly recurring problems is threading of film into the projector and removal of film from the projector. Operations of projectors used in the above-indicated areas and related areas are more often than not amateurs, or at least not specially skilled in the operation of the projector.

Many proposals have been made to simplify the threading and the removal of film. However, even the most simplified threading mechanism as now known still requires accurate manipulation of the film and is difficult for less expert users of the projectors.

THE INVENTION

It is a broad object of the invention to provide a novel and improved threading mechanism for a projector of the general of the general kind above-referred to which reduces the skilled demand of the operator to an absolute minimum by automatically performing all the required threading and loop forming functions.

A more specific object of the invention is to provide a novel and improved threading mechanism which merely requires that the operator inserts a suitable length of film into a loading slot in the front panel of the projector enclosure or housing and then shifts an operating lever from a loading position to a threading position, and which permits an equally simple removal of the film by returning the lever into its loading position and withdrawal of the film from the loading slot by simply lifting the film out of the slot.

Another more specific object of the invention is to provide a novel and improved threading mechanism including a slot which in the loading position of the lever is clear of obstructions by components of the threading mechanism, so that the film can be inserted into the loading slot by simply dropping the film into the same without particular care on the part of the operator.

Still another specific object of the invention is to provide a novel and improved threading mechanism in which the length of film to be inserted into the slot in the front panel of the projector housing is automatically guided into the slot by guide surfaces, thereby reducing the steps to be performed by the operator in connection with the insertion of the film into the projector to a minimum.

A further object of the invention is to provide a novel and improved threading mechanism, the components of which participate in the transport of the film during projection without compromising in any way the afore-described simplicity of the film threading and removing operations.

A still further object of the invention is to provide a novel and improved threading mechanism in which the reel constituting the take-up reel when the projector is operated in reverse mode is braked to avoid slack of film and secured against slipping relative to the drive means when the projector is operated in the fast rewind mode.

SUMMARY OF THE INVENTION

The afore-pointed objects, features and advantages and other objects, features and advantages which will be pointed out hereinafter are obtained the providing in a suitable wall of the projector casing or enclosure, such as the front panel, a slot for loading the projector with the film to be threaded by dropping a length of film into the slot.

The threading mechanism comprises a chassis stationarily mounted within the enclosure parallel thereto. This chassis mounts a first sprocket which constitutes the take-up sprocket when the projector operates in forward mode, a second sprocket which constitutes the supply sprocket when the projector is operated in the forward mode, a lower loop forming assembly, an loading loop forming assembly and a pressure assembly for holding film in the film channel. After insertion of the film into the slot by simply dropping a length of film extending between the two reels into the same, a control lever is pivoted from an initial loading position into a threading position. As the control lever is so pivoted it causes stepwise and sequentially locking of the film to the first sprocket, then to the second sprocket, then operates the lower loop assembly for forming the lower loop, then the upper loop assembly for forming the upper loop, and finally the film pressure assembly for guiding the film into the film channel and holding it therein for action by the claw transporting the film during operation. The projector is now ready for operation.

To start the projector, the switch control arm is set on forward. This setting activates a further assembly for moving the film into coaction with the capstan of the projector and also starts the drive of the projector, such as an electric motor, and excites the projection lamp. Operation of the projector in reverse mode is effected by setting the switch control arm on reverse. This reverses the drive and also frees the film from coaction with the capstan. To effect fast rewind of the film the pivotal lever is returned into its loading position and the switch control arm is set on reverse. Return of the lever into its loading position frees the film from the sprockets and the capstan so that it can be freely pulled through the slot. Of course, it is also possible to remove the film from the slot after it is freed by return of the lever into the loading position and rewind it directly between the two reels. The threading mechanism of the invention further provides that a slip clutch permits slipping of the film when the projector is operated in reverse mode to prevent damage to the film due to excessive pull, but brakes the reel acting as take-up reel sufficiently to prevent slack in the film. This slip clutch is automatically changed to a setting locking the take-up reel during fast rewind to prevent slippage of this reel relative to the drive means during this mode of operation.

DETAILED DESCRIPTION OF THE INVENTION

In the accompanying drawing a preferred embodiment of the invention is shown by way of illustration and not by way of limitation.

In the drawing:

FIG. 1 is an operating-side view of the projector ready for carrying or storage;

FIG. 2 is an operating-side view of the projector set up for operation, a loop of film extending between supported reels being shown inserted into the projector loading slot;

FIG. 3 is an operating-side view of the projector in the loading for the left hand covers being swung away and the right hand cover being removed to show control and film positioning parts;

FIG. 6 is an operating-side view of the front portion of the projector in the loading mode, certain parts being deleted for clarity;

FIG. 7 is a view of the operating mode control handle and micro-switches associated with control parts shown in FIG. 6;

FIG. 8 is a view of the operating mode control switch cam and detent means;

FIG. 9 is an operating-side view of the rear portion of the projector in the loading mode, certain parts being deleted for clarity;

FIG. 10 is a perspective exploded view of the rear sprocket shoe-guide arm and cam shown assembled in FIG. 9;

FIG. 12A is an elevation section view of the take-up clutch taken on line 12A–12A in FIG. 12, the reel arm actuated snubber deleted for clarity;

FIG. 12B is an elevation section view taken on line 12B–12B in FIG. 12A;

FIG. 13 is an operating-side view of the upper front portion of the projector in the operating mode;

FIG. 14 is an operating-side view of the rear portion of the projector in the operating mode;

FIG. 16 is a driving-side view of the rear portion of the projector in the operating mode;

FIG. 26 is a detail view of the driving side showing part of the mechanism in the Forward mode, the Reverse mode being indicated in dot-dash outline;

FIG. 27 is a schematic view of the sound scanning area and film in Forward mode;

FIG. 28 is similar to FIG. 27, except that the Reverse is shown;

FIG. 29 is an operating-side detail view of a diminishing lower film loop triggering the automatic looping mechanism;

FIG. 30 is a driving-side detail view corresponding to the action shown in FIG. 27.

PROJECTOR SET-UP

Figure 4:
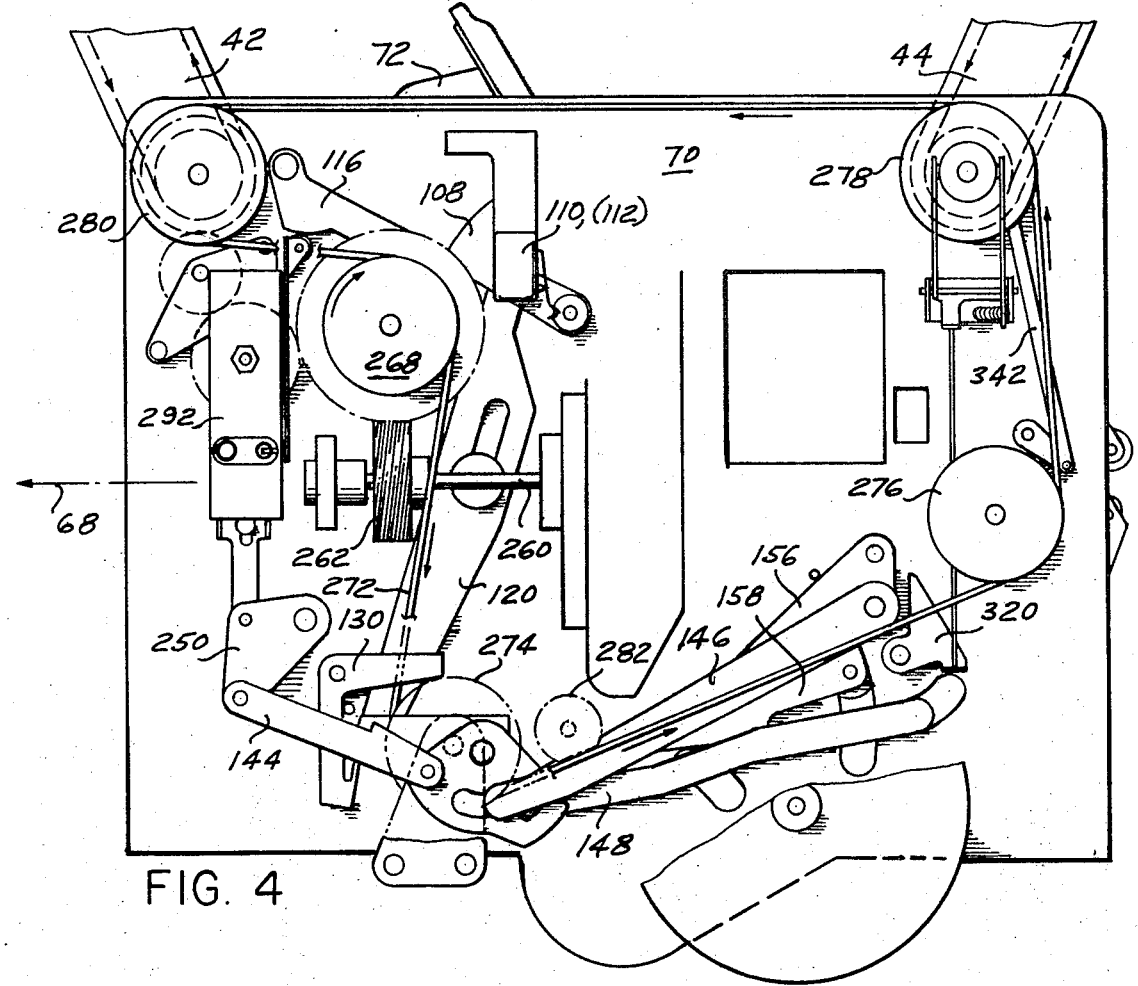
FIG. 4 is a driving-side view of the projector in the loading mode, the cover being removed to show the belt drive and film positioning parts associated with parts shown in FIG. 3.
Figure 5:
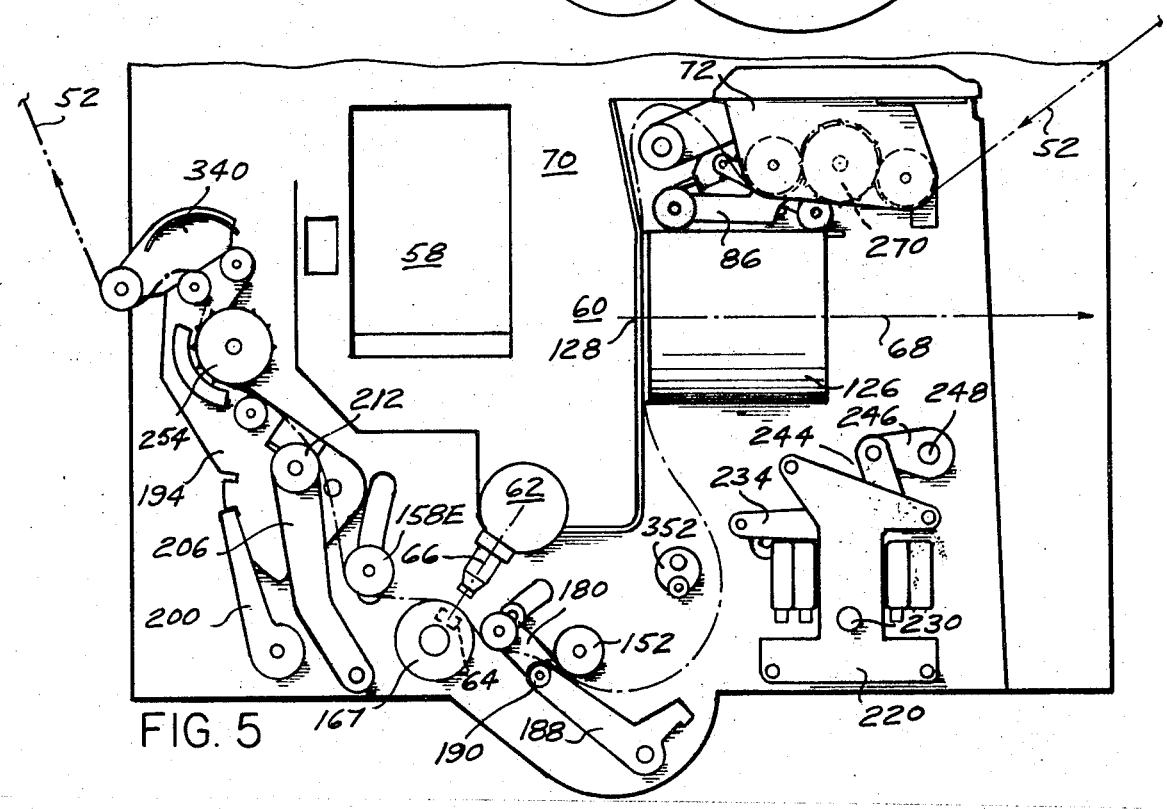
FIG. 5 is a view similar to FIG. 3, except that the projector is in the operating mode.

Referring to FIGS. 1 and 2, projector 10 comprises a housing 12 including two compartments, namely, a lower compartment 14 and an upper compartment 16. Compartment 14, containing the sound electronics, mounts a volume control 18 and a tone control 20. This portion of the projector, including a speaker mounted in front face 12A, is not part of the present invention and is therefore not further described.

Compartment 16 is provided with a cover 22 hinged at the upper edge, a conver 24 hinged at the rear or left-hand edge and a cover 26 fixed at the forward portion. Covers 22 and 24 give ready access to the film transport mechanism and the lamp housing. Cover 26, opened only for servicing, gives access to operating controls and the projection optics. Externally, cover 26 shows a lens barrel 28, a focusing control knob 30 and an operating control handle 32 mounted on an escutcheon indicating the operating mode (Off, Forward, Reverse)

For identification only, not being part of the invention, housing 12 shows a framing knob 34, a tilt-clamping knob 36, an electrical cord storage compartment 38 and a carrying handle 40

Housing 12 supports pivotally a supply reel arm 42 and a take-up reel arm 44. These arms, when folded as seen in FIG. 1, do not extend beyond the outlines of housing 12, making the projector compact for packing and storage. When opened out to the position of FIG. 2, a detent means between the arms and the housing locks in to prevent collapse. To fold back the arms, a push-button 46 in each arm releases the detent. In this regard it may be observed that parts of the film mechanism not seen in FIG. 1 are exposed in FIG. 2. The retraction of these parts, resulting in a more compact assembly, is effected by employing a linkage with arm 44. This feature will be more fully described later.

Two features seen in FIG. 2 are part of the invention, namely, a gate lever 48 and a slot 50 defined by the common separations of covers 22, 24 and 26. The upper projection 26A of cover 26 and the lower projection 22B of cover 22 are rounded and taper inwardly to a lesser radius. Compartment 14 along lines 14A, cover 22 along line 22A and cover 24 along line 24A all slope towards slot 50. By such arrangement, a single-step procedure loads the projector. A second step places the projector in the oeprating mode.

LOADING THE PROJECTOR

FIG. 2 shows a reel of film 52 on a supply reel 54, the film lead connected to a take-up reel 56. The bridging section 52A of film 52 is merely extended into a loop, slipped between lever 48 and projection 26A and, aided by the sloping surfaces adjoining slot 50, is deposited therein. While still grasping the film loop, a slight pull takes up the slack as the film aligns itself into the plane of the reels, first lying in a clear channel passing through the film guide and transport mechanism, then snugging into a path of minimum length, as several guides are engaged.

THE MECHANISM ASSOCIATED WITH PLACING THE PROJECTOR IN THE OPERATING MODE

A downward movement of lever 48 locks in the film and readies the projector for operation. The construction of this mechanism is now described.

For purposes of clarity, construction details not a part of the invention are omitted. These details, however, are schematically indicated in FIG. 3 by the following references: a projection lamp, motor and fan in the area 58; a shutter, transport and framing mechanism in the area 60; an exciter lamp for the sound track in housing 62 and a photo-electric cell 64 in line with the exciter lamp optics as indicated by the dot-dash line 66. An arrowed line 68 indicates the projection axis.

Referring to the figures generally with periodic references to figures in particular, unless and until stated otherwise, the projector is assumed in the loading position with the operating mode handle 32 in the "Off" position.

The entire mechanism of the invention is mounted on a chassis 70, that portion seen on the operating side in FIG. 3 cooperating with the portion seen on the driving side in FIG. 4 by means of members passing through openings in the chassis wall.

Gate lever 48, by which the projector is manually changed from the loading to the operating mode, shows a frame 72 spindling a pair of sprocketed film guides 74A and 74B, as best shown in FIG. 6. Frame 72 extends to a pivotal support 76 on chassis 70 carrying a shaft 78 therethrough. Shaft 78, fixed to support 76, turns with lever 48 thereby operating parts behind the chassis, to be described. A plate 80 attached to frame 72 pivots a link 82 carrying a lift roller 84. Plate 80 also has a tripping cam 80A.

An upper loop arm 86, pivoting on a bearing 88, has an offset 86A and terminates in a bearing spindling a looping film guide roller 90. Arm 86 is shown supported by roller 84 contacting the arm at an arcuate edge 86B. A fixed bracket 92 assures that link 82 does not turn clockwise from the position shown thereby losing contact between roller 84 and edge 86B.

A looper latch 94 is pivotally supported at a bearing 96. While free to turn for tripping, the latch rests on a bearing plate 98. The short leg of the latch is bent as at 94A and is seen in this position as restraining arm 86 against counter-clockwise rotation.

To secure gate lever 48 in the operating mode, a latching means is provided. A spring, not shown, biases a latch arm 100 clockwise about a pivot 100A to the position shown. The latching portion 100B of the arm engages a latch lock 102 on chassis 70. Frame 72 also serves as a positive stop. To release the latch, a finger pad 72A pivotally supported inside a handle 72B is squeezed. The resulting pivoting motion is transferred to an extension 100C on arm 100 thereby turning the arm counter-clockwise out of latch lock 102.

Figure 11:
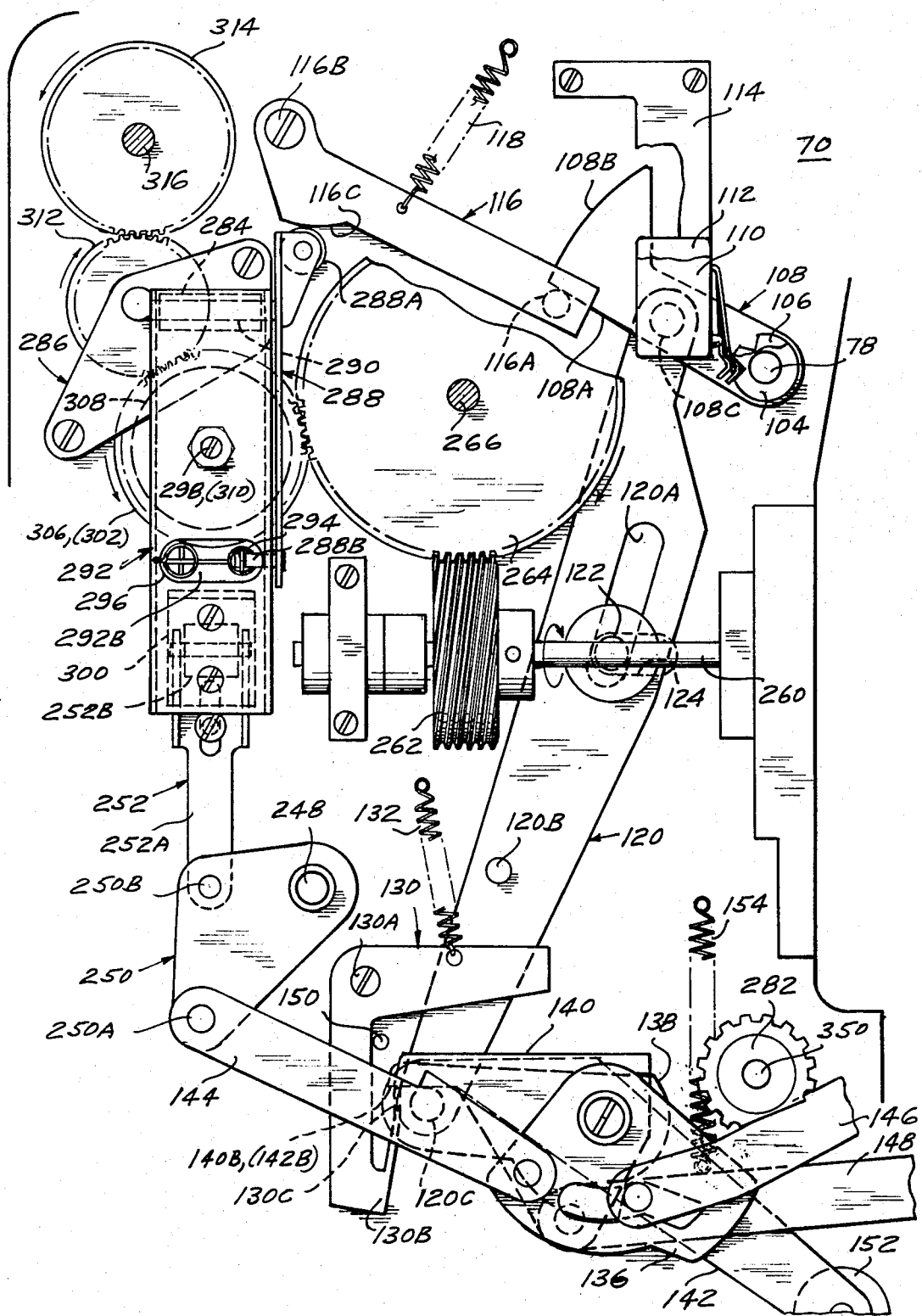
FIG. 11 is a driving-side view of the front portion of the projector in the loading mode, certain parts being deleted for clarity.

Shaft 78, on the drive side is shown in FIG. 11 supporting two cams 104 and 106 and an actuating arm 108. Two micro-switches 110 and 112 are mounted side-by-side on a bracket 114 so that switch 110 is operable by cam 104 and switch 112 by cam 106. Inspection of these parts shows that the fall in cam 104 releases switch 110 while the fall in cam 106 being out of contact with its switch, switch 112 is operated. The angular displacement between the falls equals the total angle of the gate lever movement.

Arm 108 serves two purposes. First, a straight edge 108A and an arcuate edge 108B bear against a pin 116A in a lever 116 as the gate lever 48 is turned. This causes 116 to turn clockwise about a pivot 116B, against biasing by a spring 118. Second, a pivot 108C mounted on arm 108 and spindling a link 120 causes the link to move downward.

The function of lever 116 in connection with a rewind release mechanism will be described later. Link 120 is provided with a slot 120A, a tripping pin 120B and pin 120C. Slot 120A engages a pin 122 that passes through an opening 124 in chassis 70 and is fixed in a horizontally slidable lens barrel 126 to which is attached a film pressure plate 126A shown in FIG. 6. As is evident, the downward movement of link 120 is translated into a horizontal movement of housing 126 toward film gate 128 (FIG. 6). Pin 120B in its downward movement turns a tripping arm 130 spindled on a bearing 130A. This arm is formed with a hook 130B that terminates in a tripping face 130C. Turning against a counter-clockwise bias by a spring 132, face 130C moves out from under parts to be described.

Figure 17:
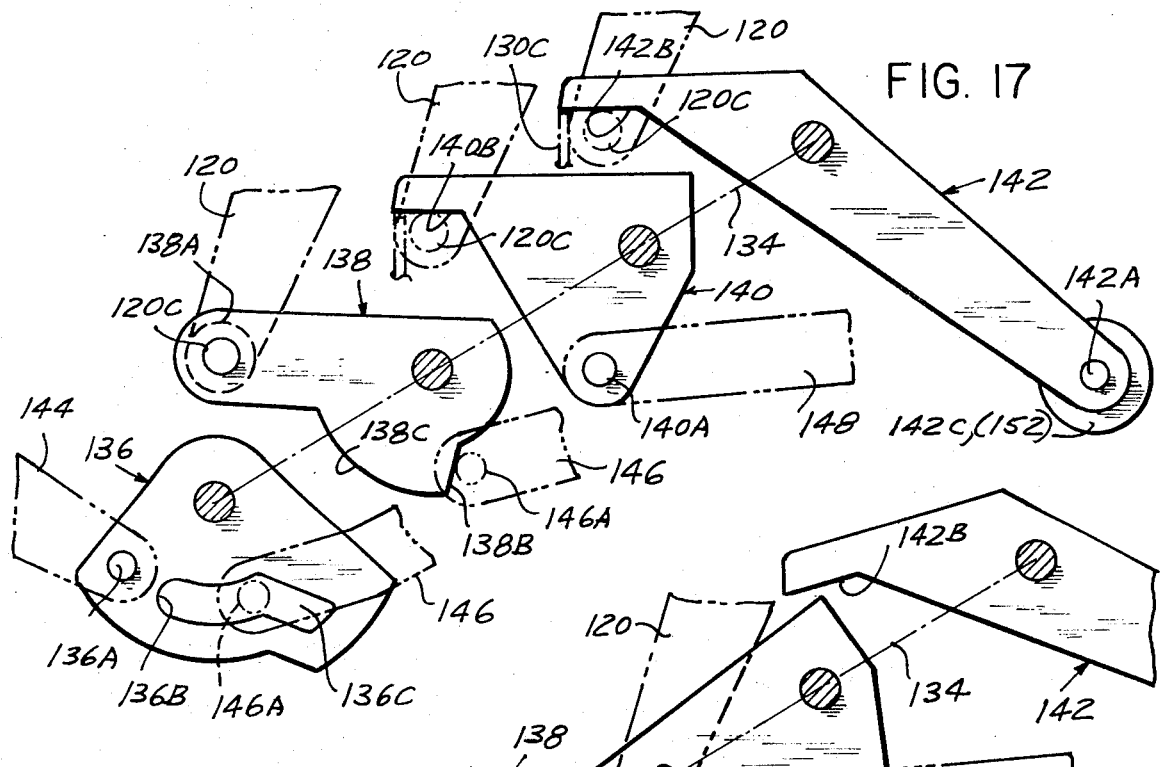
FIG. 17 is a perspective exploded view of four actuating parts in the loading mode and shown assembled in FIG. 11.

A bearing 134 spindles four members. Referring to FIGS. 11 and 17, these members are: an operating mode actuating arm 136, a drive link arm 138, a rear sprocket shoe trip arm 140 and a lower loop roll arm 142.

Arm 136 spindles a link 144 at a pivot 136A. An arcuate slot 136B extends into an angularly disposed detent 136C. This slot accepts a pin 146A fixed on a link 146.

Figure 18:
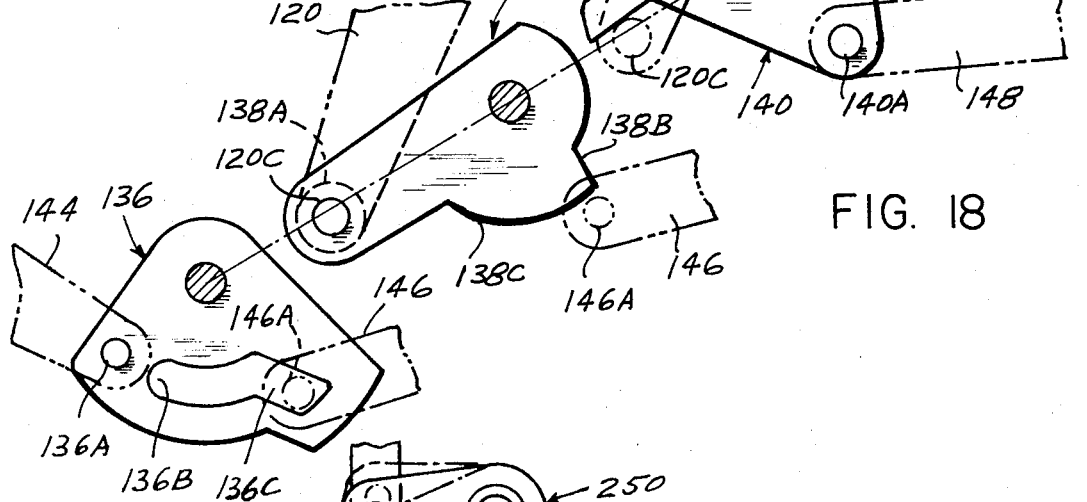
FIG. 18 is a view similar to FIG. 17 except that the parts are in the operating mode and shown assembled in FIG. 15.

Arm 138 has a bearing 138A that spindles pin 120C on link 120. A cam 138B acts as a stop for pin 146A as link 146 is biased to the left by a spring and mechanism to be described. By comparing FIGS. 17 and 18 it will be seen that rotation of arm 136 does not affect link 146 until arm 138 is turned counter-clockwise forcing link 146 to move into slot 136C. Completion of the rotation of arm 138 brings arcuate edge 138C across pun 146A. Pin 146A is then locked in slot 136C and arm 136 will move arm 146 to the right.

Arm 140 spindles a link 148 at a pivot 140A. A nose 140B caught up by a latch 130C keeps arm 140 in the position shown in FIG. 17. Pin 120C shown in contact with nose 140B turns arm 140 clockwise, when link 120 is raised, until latch 130C is cleared and trip arm 130 can then snap under nose 140B. A pin 150 serves as a stop as seen in FIG. 11.

As shown in FIG. 17, arm 142 spindles a collar 142C and a loop roller 152 at a bearing 142A. A nose 142B functions in the same manner as nose 140B.

A biasing spring 154 for arm 142 is shown in FIG. 11. The biasing spring for arm 140 is in a part of the mechanism to be described.

Figure 12:
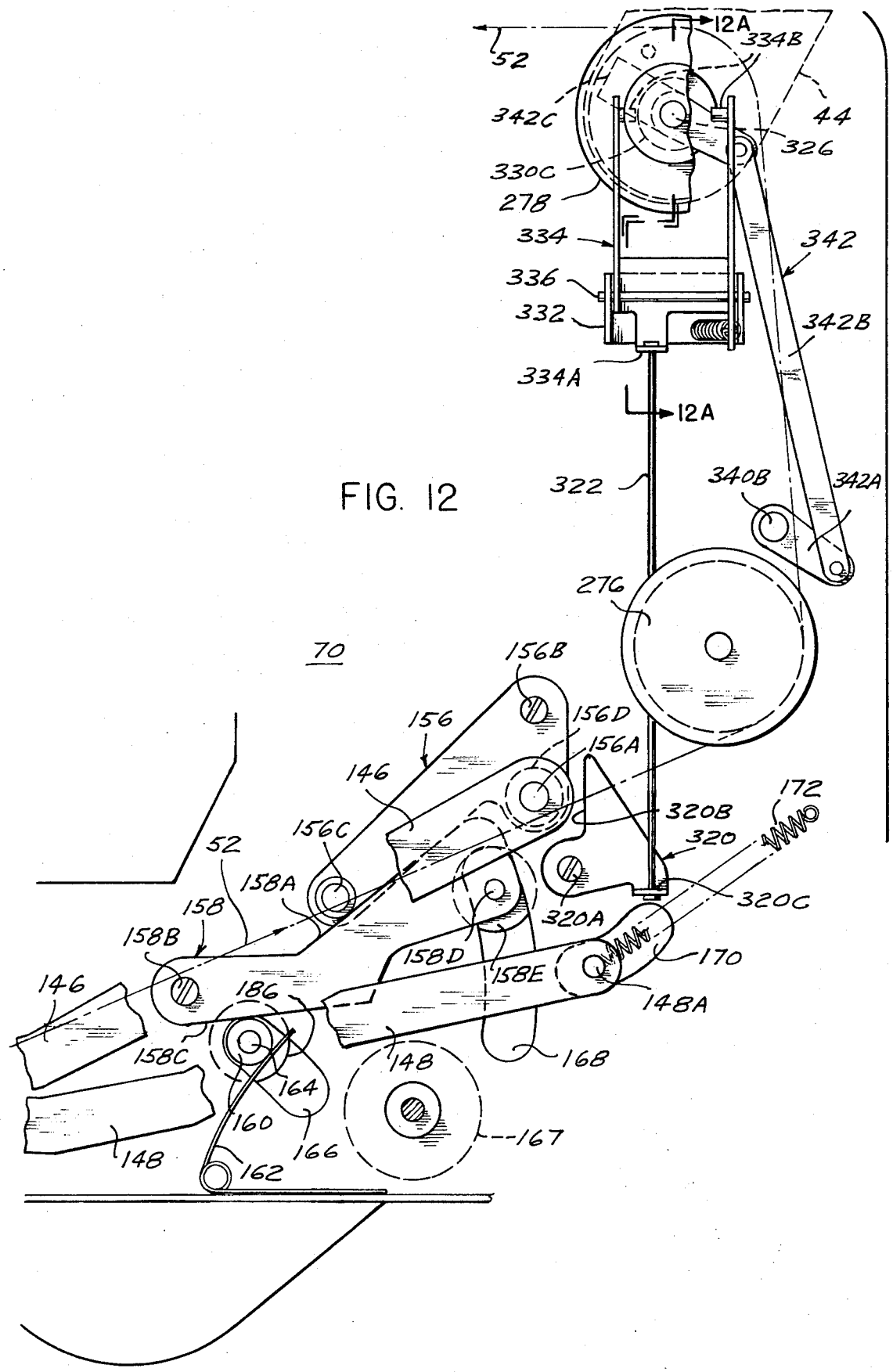
FIG. 12 is a driving-side view of the rear portion of the projector in the loading mode, certain parts being deleted for clarity.

Referring to FIG. 12, link 146 is spindled on a bearing pin 156A on a sound-capstan-wrap actuating arm 156. This arm, spindled on a bearing at 156B carries a cam follower 156C. A collar 156D actuates the take-up clutch mechanism to be described. Follower 156C bears on a cam surface 158A on an arm spindled on a bearing at 158B. Arm 158 has a second cam surface 158C against which a cam follower 160 is urged by a spring 162. A shaft 164 spindling follower 160 extends through an arcuate opening 166 to a sound-capstan-wrap 167 mechanism to be described. Arm 158, further, has a shaft 158D extending through an arcuate slot 168 to a wrap roller 158E.

The action following rotation of arm 138 now becomes evident. Spring 162, through cam follower 160, biases arm 158 counter-clockwise. Arm 158, through cam follower 156C, biases arm 156 clockwise, thereby urging link 146 against arm 138.

Referring to FIG. 12, link 148 at the far end supports a pin 148A extending through an arcuate opening 170 to a rear shoe mechanism to be described. The biasing spring noted above for arm 140 is indicated at 172.

On the operating side, referring to FIGS. 9 and 10, a shaft 164 emerging through an opening 166 is fixed to a pinch roller actuating arm 174. Arm 174, spindled on a bearing 176, carries a pin 174A, which, in turn, spindles an arm 180. Arm 180, biased counter-clockwise by a coil spring 182, against a stop 174A on arm 174, spindles a pinch roller 186 on a shaft 180A.

A pinch roller damper arm 188, also spindled on bearing 176, is in contact with collar 142C indicated in phantom outline behind loop roller 152. A damping roller 190 is spindled on a pin 188A. Arm 188 is biased clockwise by a spring 192 and stopped by a nose 188B contacting a chassis bracket not shown. It therefore becomes evident that downward movement of arm 142 will lower roller 190.

Referring to FIGS. 9 and 10, a rear sprocket shoe guide arm 194 is spindled on a chassis-mounted bearing 196. Arm 194 includes a pair of detents 194A and 194B, three film guide rollers 194C, 194D and 194E, a shoe 194F, a pad 194G and an opening 194H.

A cam 198 is separately spindled on a bearing 196. Cam 198 is fixed to pin 148A protruding from opening 170 in the chassis wall, the rear end of the pin terminating through an opening 194H. Thus, when link 148 is moved clockwise in FIG. 9, the cam turns until the pin touches arm 194. From this point on both turn together.

A trip arm 200, spindled on a bearing at 200A, is biased clockwise by a spring 204. The end of arm 200 is bent into a pawl 200B. This pawl is shown engaged in detent 194A. Returning to cam 198, a dwell portion 198A is clear of pawl 200A because it is below the bottom of detent 194A. A rise portion 198B is higher than the detent. It now becomes evident that movement of link 148 moves arm 200 out of one detent, turns arm 194, finally permitting the pawl to drop into the other detent. The result is that arm 194 is held firmly in either of two positions, the reverse action taking place from dwell 198C.

A damper arm 206, spindled on a bearing at 206A is biased clockwise by a spring 210. The end of arm 206 spindles a roller 212 on a pin 206B that extends rearward into contact with bracket 194G. This bracket therefore serves as a stop for the clockwise bias of the arm.

THE MECHANISM ASSOCIATED WITH PROJECTOR OPERATING MODE CONTROL

The construction of the mechanism connected with movement of the operating mode control from "Stop" to "Forward" and "Reverse" is now described.

Referring briefly to FIG. 2 and more particularly to FIGS. 6, 7 and 8, control handle 32 is mounted over an escutcheon indicating that the projector is in the "Off" position when the handle is vertical, in the "Forward" position when turned 45° clockwise and in the "Reverse" position when turned 45° counter-clockwise.

A bracket 220, mounting four micro-switches 222, 224, 226 and 228, spindles a control shaft 230. At the near end, shaft 230 mounts handle 32, at an intermediate point a cam and detent plate 232 and at the far end an arm 234 spindling a cam follower 234A.

A cam follower arm 236, spindled on a bearing at 236A, in turn spindles a cam follower 236B. The arm, biased counter-clockwise by a spring 238, thus detents the assembly on shaft 230 in each of the three positions described above. Cam 232 has four rises: a rise 232A operating micro-switches 222 and 228, a rise 232B operating microswitch 224, a rise 232C operating microswitch 226 and a rise 232D operating micro-switch 228. These operations are shown in FIGS. 19 and 20 to be described further under "Operation".

Figures 19, 20, 21, 22, 23, 24:
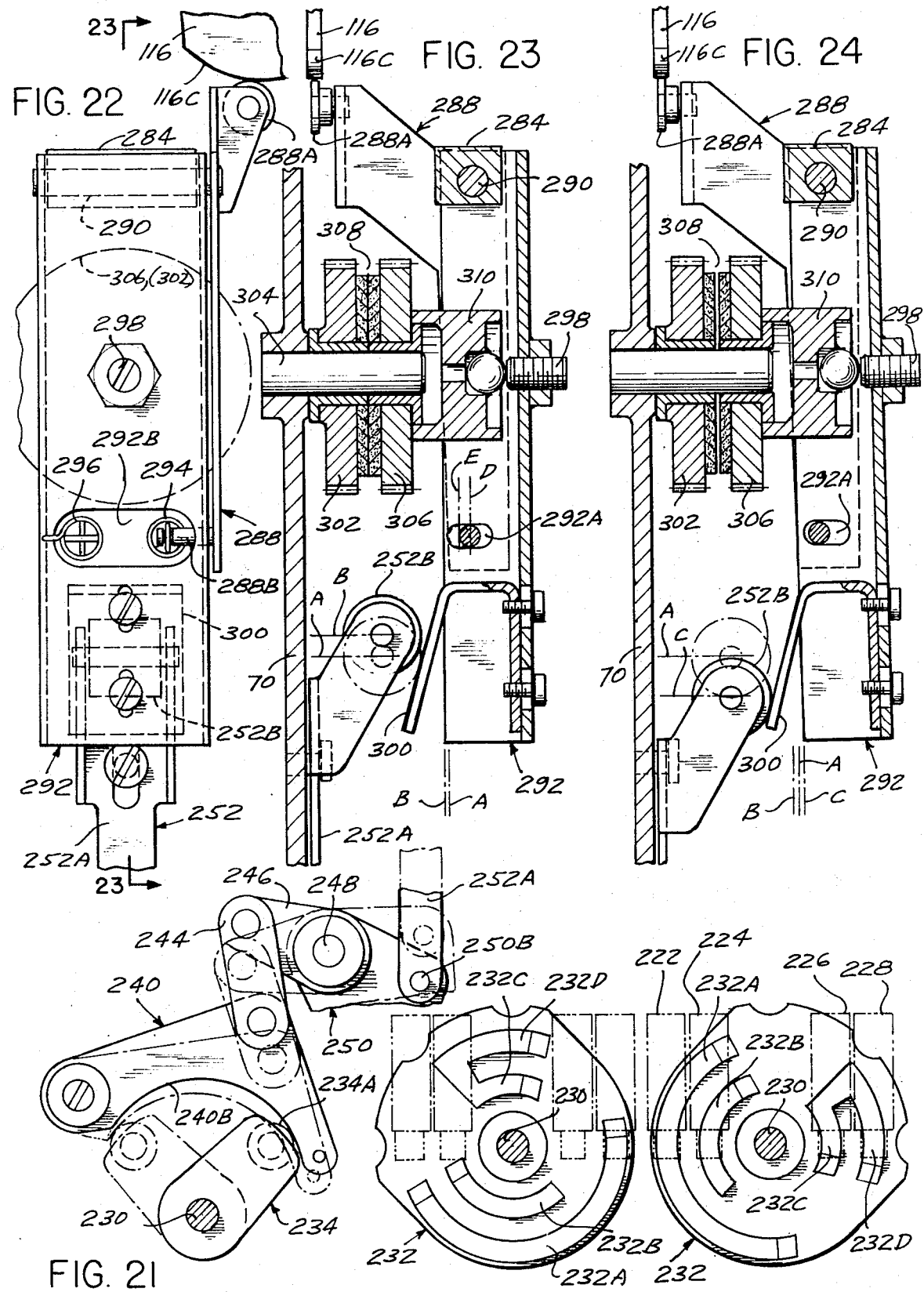
FIG. 19 is a view of the operating mode control switch cam in the Forward mode, the micro-switches indicated in phantom outline.
FIG. 20 is a view similar to FIG. 19 except that the cam is shown in the Reverse mode.
FIG. 21 is a view of operating mode control parts, solid outline indicating the Forward mode and dot-dash outline indicating the Reverse mode.
FIG. 22 is an enlarged view of the rewind clutch mechanism in the operating mode.
FIG. 23 is a view similar to a section view on line 23–23 in FIG. 22 except that the cam follower is in the Reverse position.
FIG. 24 is similar to FIG. 23 except that the cam follower is in the Forward position.

Referring now to FIGS. 6, 11 and 21 in particular, cam follower 234A cooperates with a cam lever 240 spindled on a bearing at 240A. Lever 240 has a cam surface 240B contoured generally on a radius eccentric to the left with respect to shaft 230. Biased towards cam follower 234A by a spring 242, it becomes apparent that lever 240 turns counter-clockwise when handle 32 is turned to "Forward" and clockwise when the handle is turned to "Reverse". A link 244 and an arm 246 transmit this movement to a shaft 248 passing through a bearing to the driving side of chassis 70.

Referring to FIG. 11, shaft 248 emerges and is fixed to a lever 250 spindling link 144 on a bearing at 250A and a cam follower assembly 252 on a bearing at 250B to be described. Therefore, from the control linkage described above, it is seen that lever 250 turns counter-clockwise for "Forward" and clockwise for "Reverse". This may be seen in FIG. 25 and, carried further through the linkage in FIG. 26, both figures to be described later under "Operation".

THE MECHANISM ASSOCIATED WITH THE PROJECTOR DRIVE

The preceding description stops short of the mechanism influencing the drive system. Closing lever 48 acts on a rewind clutch means and operating handle 32 acts on both the rewind clutch and a take-up clutch means.

Referring to FIGS. 4 and 11, a motor, not shown, drives a shaft 260 mounting a worm gear 262. A worm-driven gear 264 is fixed on a shaft 266 to which a belt-driving pulley 268 is fixed on the near end. The far end, extending through the chassis, has fixed on it a film feed sprocket 270 shown in FIGS. 3 and 6. A belt 272, after leaving pulley 268, passes around an idler pulley 274, a pulley 276 driving a take-up sprocket 254, a take-up clutch pulley 278 and an idler pulley 280. The belt and pulleys are the positive drive type, the belt having teeth on both sides. Between pulleys 274 and 276, the belt passes close to the cut wall of a segmented pulley 282 associated with an automatic lower looping means to be described. The trace of the belt in the foregoing proceeds in the direction in which the belt is driven in "Forward" as indicated by the arrows.

Referring to FIGS. 11, 22, 23 and 24, the rewind clutch means comprises a bearing block 284 mounted on a bracket 286 which, in turn, is mounted on the chassis. A clutch lever 288 has a shaft 290 affixed thereto that slip-fits the hole in block 284. A channel-shaped housing 292 straddles block 284 pivotally hung on shaft 290. Thus, housing and lever turn independently on an axis through the shaft 290. Lever 288 spindles a cam follower 288A that is in contact with a cam 116C on lever 116. The lower extremity of lever 288 supports a pin 288B that projects through a slot 292A in housing 292. Two coil springs attached to a bracket on the chassis may be seen through an assembling-access opening 292B. One spring 294 is attached to pin 288B; the other spring 296 is attached to housing 292. Thus, both lever and housing are biased in towards the chassis wall. Housing 292 is provided with an adjustable bearing post 298 and an adjustable cam 300.

Gear 264 meshes with a gear 302 spindled on a shaft 304 fixed on wall 70. A like gear 306 is spindled and slidable on the same shaft. A friction clutch 308 has its faces fixed to each gear so that gear 306 is idle when the clutch is open. A collar 310 fixed to gear 306 retains a ball bearing 310A that is contacted by post 298. Thus transmission of rotation from gear 302 and 306 depends on the position of housing 292.

Cam follower assembly 252 comprises a slidable-supported bracket 252A and a cam follower 252B that contacts cam 300 depending on the position of control handle 32. Pin 288B is free in slot 292A only when lever 48 is lowered. Raised, lever 288 turns and the pin bears against the inside wall of opening 292A.

By adjustment, the effect on clutch 308 for the possible combined positions of lever 48 and control handle 32 is summarized in the following:

With lever 48 closed, FIG. 23, and control handle 32 moved from "Stop" to "Reverse", cam follower 252B moves from the dot-dash position A full-line to position B. Spring 296 alone puts light pressure on the clutch so that the supply reel, now in reverse to take up film, is driven but is allowed to slip. For rapid rewind, opening lever 48 adds spring 294 to spring 296 when pin 288B moves from position D to E, thereby closing the clutch tightly. Referring to FIG. 24, regardless of lever 48 position, the clutch is narrowly open with cam follower 252B in "Stop", position A, and slightly more open in "Forward", position C. Either way, the supply reel is free for framing or running.

Gear 306, through an idler gear 312, drives a gear 314 that is fixed on a shaft 316 (FIG. 11). This shaft, passing through the wall, is connected to the supply reel drive inside arm 42. The shaft, at the near end, also spindles idler pulley 280 shown in FIG. 4.

Referring to FIGS. 12, 12A and 12B, the take-up clutch means is not described. A crank 320, spindled on a bearing at 320A, has a face 320B that is pushed by collar 156D when control handle 32 is in "Forward". A bend 320C is connected to a rod 322 that extends upward to the clutch assembly.

A take-up reel driving pulley 324 is pinned to a shaft 326 spindled in a bearing in the chassis wall. The shaft, in turn, spindles belt pulley 278 provided with a positively engageable clutch face 278A. Another collar 330, splined to shaft 326 at 330A, has a matching positively engaging clutch face 330B and an annular groove 330C. Thus, pulley 324 is driven by pulley 278 when the positive clutch is engaged. As shown in FIG. 12B, the tooth on face 328B turns to meet the tooth on face 330B. Slippage at the take-up reel 56 is provided by a cork-lined drum resting on a driven roller affixed to the reel arm spindle at the extremity of reel arm 44.

A yoke 332 spindles a double-armed crank 334 on a shaft 336. Crank 334 is connected at 334A to rod 322. At the upper end of each arm, two pins 334B engage the annular groove 330C. Thus, the belt drive is connected to the film take-up reel when handle 32 is in "Forward". When collar 156D is out of contact with face 320B, a spring 336 maintains disengagement of the positive clutch.

THE FILM SNUBBER

Referring to FIG. 9, a snubber 340 shows an arm 340A that is fixed to a shaft 340B spindled in a bushing and passing through the chassis wall to a retraction means. Arm 340A has a film-guiding fence 340C and spindles a snubbing roller 340D. A coil spring 340E biases the snubber counter-clockwise to a stop 340F. Referring to FIG. 12, shaft 340B emerges and, on the driving side, is connected to a parallel linkage 342 through a crank 342A and a link 342B, to an arm 342C. Take-up reel arm 44 carries with it a bushing in which a pin 44A is fixed so that folding of the arm causes the pin to contact arm 342C and thereby turn snubber 340 from the positon shown in FIGS. 9 and 2 to the position where it is inside the boundary of the folded or packaged projector shown in FIG. 1.

THE AUTOMATIC LOWER LOOPING MECHANISM

Referring to FIGS. 4, 6 and 11 in general, and to FIGS. 29 and 30 in particular, the mechanism associated with segmented and toothed pulley 282 referred to earlier is now described. Pulley 282 is fixed to a shaft 350 spindled on a bearing and passing through the chassis wall to an arm drive 352 spindling a roller 354 (FIG. 6). Film 52, as originally loaded and running normally is in the position shown in FIG. 6. Also, arm 352 is in the position shown in the same figure and, correspondingly, pulley 282 is in the position of FIGS. 4 and 11 where FIG. 4 shows belt 272 running close to, but clear of, the segment face of the pulley. Should the film loop tighten, roller 354 is contacted. Arm drive 352 moves from position A to B, FIG. 29, and the first tooth of the gear is caught up by the moving belt, FIG. 30. When roller 354 passes position C, the loop has been restored. The roller continues until the gear loses its drive thus leaving the looping mechanism in the original neutral position.

CIRCUIT SCHEMATIC OF THE PROJECTOR

Figure 31:
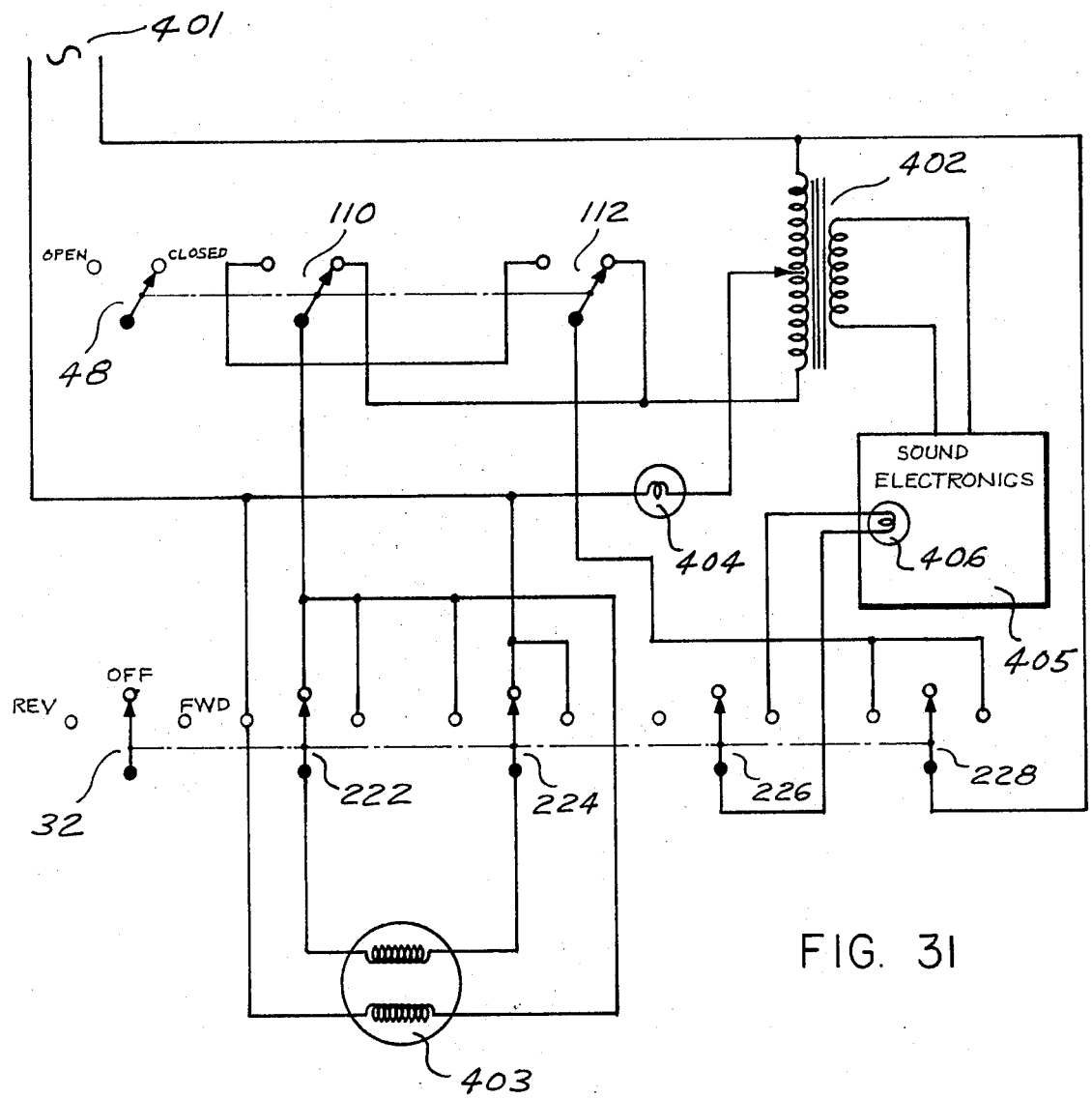
FIG. 31 is a circuit schematic of the projector.

Referring to FIG. 31, the schematic wiring diagram shows lever 41 closed and control arm 32 in the "Off" position.

An a.c. power source 401 supplies a transformer 402, a motor 403 and, on an adjustable hi-lo illumination projector lamp 404.

The secondary side of transformer 402 supplies the sound electronics 405 including a conventional rectifier, a photo-electric cell, an amplifier, and a speaker (not shown). An exciter lamp 406 is shown to make its operation clear with the body of the schematic.

From the description of the projector operation and an examination of the figure, it will be seen that:

1. Closing lever 48: energizes sound electronics 405 and turns on projector lamp 404.
2. Moving control handle 32 to "Forward": turns on motor 403 and exciter lamp 406.
3. Moving control handle 32 to "Reverse": reverses motor 403 and turns off exciter lamp 406.
4. Placement of lever 48 in an intermediate position turns off the motor and the lamps.

OPERATION OF THE PROJECTOR

I. Loading the Film (FIGS. 1 and 2)

A. Lever 48 is placed in its raised position and handle 32 in its "Off" position if not already in these positions.

B. Arms 42 and 44 are extended to their open positions and reels 52 and 56 mounted.

C. Film 52 is attached to take-up reel 56 and a length of film between the reels inserted into film slot 50.

D. Reel 56 is turned to take up film slack. This brings the film into contact with idler 74B, FIG. 6; upper looping roller 90, FIG. 6; lower automatic loop-restoring roller 354, FIG. 6; lower loop forming roller 152, FIG. 9; snubber roller 340D, FIG. 9.

II. Positioning the Film for Operation ("Threading") Lever 48 is lowered to its latching stop position. In this movement of 60° rotation the following actions occur:

A. In the first 30°:
1. Rollers 194C and 194D lock the film onto take-up sprocket 254. Referring to FIGS. 9, 10, 11, 12, 14, and 15, rotation of shaft 78 mounting lever 48 turns arm 108 which causes pin 120B to turn arm 130 and trip arm 140. This allows spring 172, FIG. 12, to pull up arm 148; and, through pin 148A bearing against opening 194H, FIGS. 9 and 14, brings rollers 194C and 194D against sprocket 254. Damper rollers 212, kept clear for film loading by bracket 194G, now moves into operative position against the film.
2. Rewind clutch 308 is eased off from tight contact holding the supply reel rigid. Referring to FIGS. 11, 15, 22 and 23, spring 294 presses the faces of clutch 308 into tight contact, and, since gear 264 is rigid, the supply reel is kept from turning. Arm 108 turns arm 116, which then turns arm 288 to remove the pressure of pin 288B, due to spring 294, against the inner end of slot 292A. Thus, housing 292 supplies pressure to the clutch faces only through lighter spring 296.
3. Lens barrel 126 and film pressure shoe 126A move in part away. Referring to FIGS. 6 and 11, downward movement of slanted opening 120A cams pin 122, and with it the barrel and plate from the position of FIG. 11 towards the position of FIG. 15.
4. The film, already in contact with roller 74B, FIG. 6, is now contacted by roller 74A and the film moves towards the position of FIG. 13.

B. Form 30° to 35°, FIGS. 9, 11, 14 and 15, arm 130 releases arm 142 so that spring 154 can move loop roller 152 out of the lower loop area. This in turn permits damper roller 190 to move into contact with the film.

C. From 35° to 40°, FIGS. 6, 13, arm 82 moves away from support of arm 86 so that upper loop roller 90 drops out of the loop area.

D. From 40° to 45°, film pressure shoe 126A is brought up to, but not into, the film drive claw.

E. In the remaining 15°, the film is seated on sprocket 270, FIG. 13, as the gap at pressure shoe 126A is closed.

During the movement of lever 48, pin 120C on link 120, FIGS. 11, 12, 14, 15, 16, 17 and 18, turns arm 138 bearing on pin 146A. Link 146 moves against restraint by spring 162A, acting through cam follower 160, arm 158 and arm 156, and pin 146A drops into positive recess 136C. This links up the co-action between control handle 32, FIG. 7, with capstan rollers 186, 158E and take-up clutch mechanism, FIG. 12A. Roller 186 is moved close to capstan 167 so that the roller can respond to film tension through the biasing of spring 182, FIG. 9.

III. Operating in "Forward" Mode.

Control handle 32, turned to "Forward", does the following:

A. Referring to FIGS. 6, 25, 26 and 27, arm 234 through cam 240B turns shaft 248. The linked movement from arm 250 drives roller 186 close up against capstan 167 and moves roller 158E down so that the film is in operating wrap on the capstan. The slight gap provided between roller 186 and the capstan in "Stop" position prevents a pull of the film at the claw by flywheel action that would result in film damage.

B. Referring to FIGS. 12A, 12B and 26, the linkage from arm 250, further, turns arm 320. This causes clutch 330B to lock in with driving pulley 278, so that shaft 326 will rotate and turn take-up reel 56 through a clutch, at the reel shaft, not shown. Rewind slip, required in take-up, is at the clutch interface.

C. Referring to FIGS. 22 and 24, downward movement of cam follower 252B separates clutch 308 so that supply reel 54 can run free.

D. Referring to FIGS. 7, 8 and 19, cams 232A and 232B, which connect switches 222 and 224 in "Off" position for "Forward" operation, maintain this condition. Exciter lamp and amplifier switch 226 and projector lamp switch 228 which were open and now closed by cams 232C and 232D, respectively.

IV. Operating in "Reverse" Mode.

Figure 25:
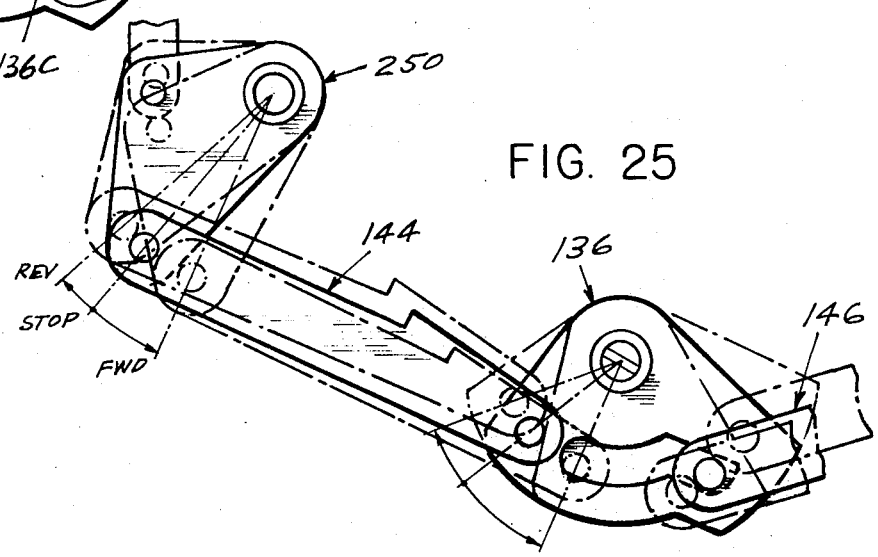
FIG. 25 is a detail view of the driving side showing part of the linkage in the operating mode; the Stop mode being shown solid and both the Forward and Reverse modes being shown in dot-dash outline.

Control handle 32, turned to "Reverse", does the following:

A. Referring to FIGS. 6, 25, 25 and 28, and to the movement of parts described above, rollers 186 and 158E are moved back so that film can move freely through the sound scanning area. And:

B. Clutch 330B is disengaged so that the take-up reel is free to feed film.

C. Referring to FIGS. 22 and 23, upward movement of cam follower 252B allows clutch 308 to be engaged with slip-friction, as determined by spring 296, so that supply reel 54 is driven in reverse for take-up.

D. Referring to FIGS. 7, 8 and 20, cams 232A and 232B release switchess 222 and 224 thereby reversing the motor. Cam 232C releases switch 226, turning off the exciter lamp and the amplifier. Cam 232A replaces cam 232D, FIG. 19, keeping the projector lamp on.

V. Rewinding the Film:

From the above-described operations, channel 50 is clear for the film to run through when lever 48 is raised. Referring to FIGS. 6 and 13, roller 84 lifts arm 86 at 86B until bend 94A can drop back by gravity.

Figure 15:
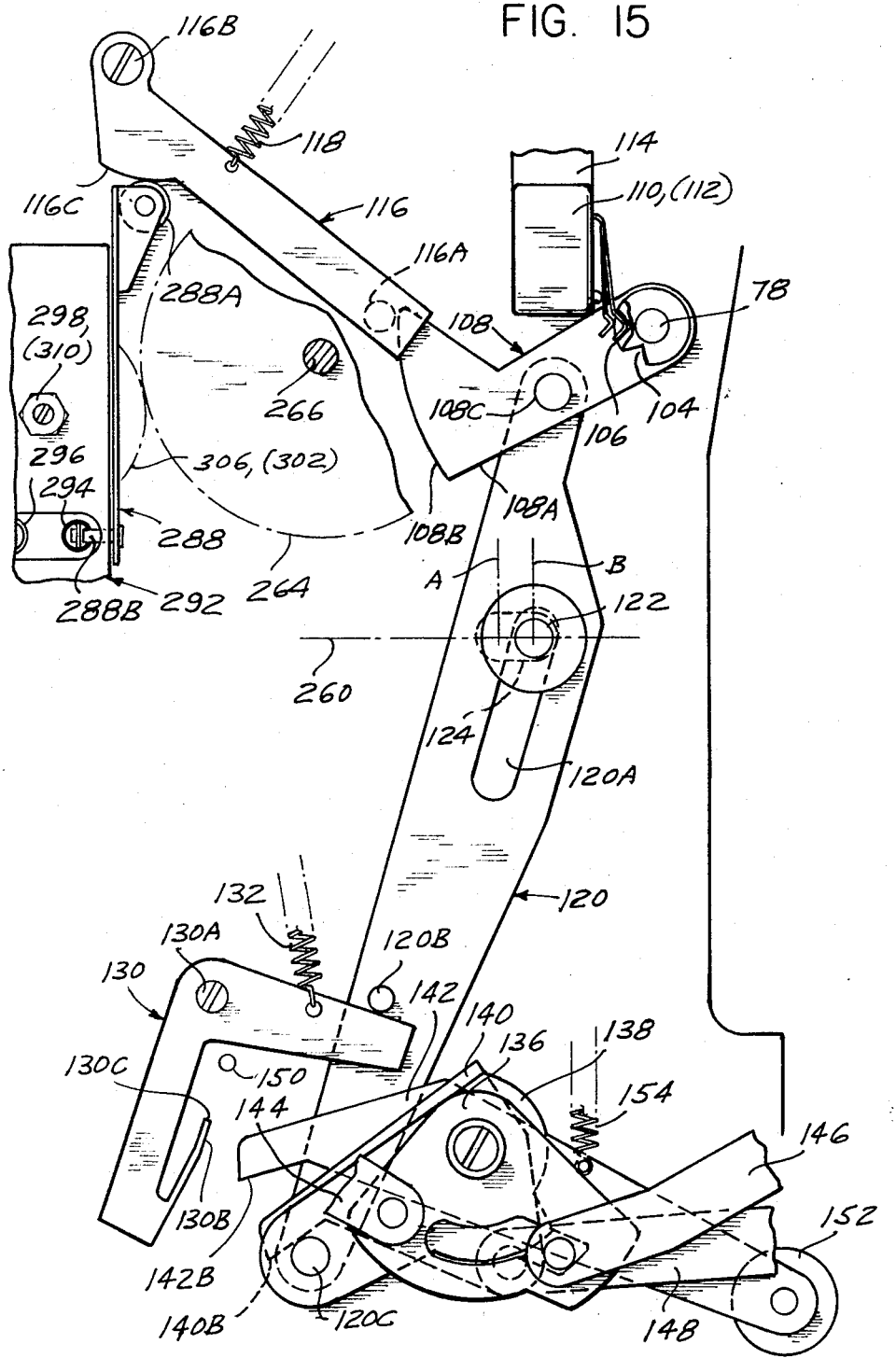
FIG. 15 is a driving-side view of the front portion of the projector in the operating mode.

Referring to FIGS. 11 and 15, cam 104 closes switch 110 in the open position of lever 48 and cam 106 closes switch 112 in the closed position of lever 48. This circuit to the motor breaks the motor current momentarily when raising lever 48 to go into rewind, thereby preventing damage to the fim. Switch 112, in addition, closes a connection to the projector lamp circuit.

Preferably, the film should be removed from channel 50 for complete rewind.

While the invention has been described in detail with respect to a certain new preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A motion picture projector with self-threading mechanism, said projector comprising in combination:

an upright enclosure including in one of its outer walls a slot for insertion and removal of a length of film, said slot extending from one wall of the enclosure to another wall thereof, said one wall having an outwardly directed protrusion adjacent to the slot end in said wall, one said protrusion constituting a film guiding means for slidably guiding thereon a film portion in addition to the length of film insertable into the slot thereby extending the effective length of said slot;

a chassis stationarily mounted within said enclosure parallel to but spaced apart from said slotted wall;

a first sprocket rotatably mounted on said chassis, a second sprocket rotatably mounted on said chassis, either of said sprockets constituting a take-up sprocket or a supply sprocket, lower loop-forming means mounted on said chassis pivotal between a loop-forming position and a retracted position, an upper loop-forming means mounted on said chassis pivotal between a loop-forming position and a retracted position, said sprockets and said loop-forming means being on the chassis side facing said slotted wall and a film holding means including a stationarily mounted film channel;

film loading and threading means pivotally supported by said one wall of the enclosure, said loading and threading means being pivotal between a first limit position constituting the film loading position and a second limit position constituting the film threading position;

a first locking means movable between an inactive position and a locking position for locking a portion of film within the slot to the first sprocket, a second locking means movable between an inactive position and a locking position for locking a portion of film within the slot to the second sprocket, said second locking means including a first pressure means supported on said loading and threading means for pivotally moving in unison therewith, a first actuating means for moving the lower loop-forming means from the loop-forming position to the retracted position, a second activating means for moving the upper loop-forming means from the loop-forming position to the retracted position and a second pressure means movable into and out of a pressure position holding film extending between said pressure means and the channel in the latter; and linkage means operatively coupling said first and second locking means, said first and second activating means and said second pressure means to said loading and threading means for sequential operation of the locking means, the activating means and the second pressure means, pivoting of said loading and threading means from the loading position through a first predetermined angle operating the first locking means for locking the respective film portion to the first sprocket, pivoting of said means through a second predetermined angle operating the first actuating means for moving the lower loop-forming means into the retracted position, pivoting of said means through a third predetermined angle operating the second activating means for moving the upper loop-forming means into the retracted position, pivoting of said means through a fourth predetermined angle causing the first pressure means on said loading and threading means to slide the film portion guide on said protrusion into the slot and locking said film portion to the second sprocket and pivoting of said means through a fifth predetermined angle moving said second pressure means into the position holding the film in the channel, said fifth angular movement of the loading and threading means placing the same in the second limit position.

2. The projector according to claim 1 wherein bias means bias said first and second locking means toward the respective inactive positions, said lower and upper loop forming means toward the respective retracted positions and said second pressure means out of the pressing position, return of the loading and threading means from the threading position to the loading position freeing the locking means, the loop forming means and the second pressure means for movement into the aforesaid positions.

3. The projector according to claim 1 wherein each of said loop forming means comprises a guide roller occupying in the loop forming position a spatial position guiding a portion of the length of film in the slot into a curved configuration, retraction of each roller leaving the respective film portion in said curved configuration, said curved film portions constituting the lower and the upper loop.

4. The projector according to claim 1 wherein the protrusion at the end of the slot in said one wall and a protrusion at the apex of the slot each include a surface slanted toward the slot, said slanted surface guiding the respective length of film to be inserted into the slot into the same.

5. The projector according to claim 4 and comprising a pair of reels rotatably supported on said one wall of the enclosure, one of said reels being disposed to feed film from and to the slot end at said one wall of said enclosure along a substantially straight path and the other reel being disposed to feed film from and to the slot end in said other wall along a substantially straight path.

6. The projector according to claim 1, and comprising a pair of reels rotatably supported by said one wall of the enclosure, each of said reels being arranged to function either as take-up reels or as supply reels, one of said reels coacting with said one wall end and the other reel coating with said other wall end of the slot, a reversible electric drive means for driving either one of said reels and both sprockets in either direction, and a circuit control means, said control means being selectively settable into an OFF position, a forward position and a reverse position, setting of the control means into the forward position closing an energizing circuit for the drive means for driving the reel coacting with said other wall end of the slot and the first sprocket in one direction, said driven reel thereby constituting the take-up reel and said first sprocket the take-up sprocket, the other reel and the second sprocket functioning as supply reel and supply sprocket, respectively, and setting of the control means into the reverse position closing an energizing circuit for the drive means for driving the reel coacting with said one wall end of the slot and the sprockets in reverse direction, said reel and the second sprocket thereby now constituting the take-up reel and the take-up sprocket, respectively.

7. The projector according to claim 6 and comprising a capstan rotatably mounted on said chassis, film wrapping means movable between a wrapping position holding film in the slot in coacting relationship with said capstan and a retracted position, and linkage means coupling said wrapping means to said control means for moving the wrapping means into either position in response to the setting of the control means, placement of the loading and threading means in the threading position and of the control means in the forward position causing movement of said wrapping means into the coacting position thereof and placement of the control means in the reverse and off positions causing movement of the wrapping means into the retracted position.

8. The projector according to claim 6 and comprising slip clutch means interposed between the drive means and the reel constituting the supply reel when the control means is set on forward and the take-up reel when the control means is set on reverse, said clutch means including friction members movable relative to each other between a slip position in which said members engage each other with a frictional grip braking the aforesaid reel but allowing slipping of said reel relative to the drive means in response to a pull of film travelling from said reel to the other reel and experiencing a pull above a predetermined value and a lock angular position locking the frictional members to each other with a frictional force preventing slipping of said reel relative to the drive means, and linkage means coupling the loading and threading means to the clutch means, said linkage means being controlled by the position of the loading and threading means and controlling the position of the friction members of the clutch means.

9. The projector according to claim 8 wherein the linkage means controlling the clutch means for moving the friction members thereof into the lock position in response to placement of the loading and threading means in the loading position and the control means on reverse thereby providing for fast rewind of the film from said other reel upon the aforesaid supply reel now acting as take-up reel.

10. A motion picture projector with self-threading mechanism, said projector comprising in combination:

an enclosure including in one of its outer walls a slot for insertion and removal of a length of film, said slot extending from one wall of the enclosure to another wall thereof;

a chassis stationarily mounted within said enclosure parallel to but spaced apart from said slotted wall;

a first sprocket rotatably mounted on said chassis, a second sprocket rotatably mounted on said chassis, either of said sprockets constituting a take-up sprocket or a supply sprocket, lower loop-forming means mounted on said chassis pivotal between a loop-forming position and a retracted position, an upper loop-forming means mounted on said chassis pivotal between a loop-forming position and a retracted position, said sprockets and said loop-forming means being on the chassis side facing said slotted wall and a film guiding means including a stationarily mounted film channel;

film loading and threading means pivotally supported by said one wall of the enclosure, said loading and threading means being pivotal between a first limit position constituting the film loading position and a second limit position constituting the film threading position;

a first locking means movable between an inactive position and a locking position for locking a portion of film within the slot to the first sprocket, a second locking means movable between an inactive position and a locking position for locking a portion of film within the slot to the second sprocket, a first actuating means for moving the lower loop-forming means from the loop-forming position to the retracted position, a second activating means for moving the upper loop-forming means from the loop-forming position to the retravted position, and a pressure means movable into and out of a pressure position holding film extending between said pressure means and the channel in the latter;

linkage means operatively coupling said first and second locking means, said first and second activating means and said pressure means to said loading and threading means for sequential operation of the locking means, the activating means and the pressure means, pivoting of said loading and threading means from the loading position through a first predetermined angle operating the first locking means for locking the respective film portion to the first sprocket, pivoting of said means through a second predetermined angle operating the first actuating means for moving the lower loop-forming means into the retracted position, pivoting of said means through a third predetermined angle operating the second activating means for moving the upper loop-forming means into the retracted position, pivoting of said means through a fourth predetermined angle locking said film portion to the second sprocket and pivoting of said means through a fifth predetermined angle moving said pressure means into the position holding the film in the channel, said fifth angular movement of the loading and threading means placing the same in the second limit position;

a pair of reels rotatably supported by said one wall of the enclosure, each of said reels being arranged to function either as take-up reels or as supply reels, one of said reels coacting with said one wall end and the other reel coacting with said other wall end of the slot, a reversible electric drive means for driving either one of said reels and both sprockets in either direction, and a circuit control means, said control means being selectively settable into an OFF position, a forward position and a reverse position, setting of the control means into the forward position closing an energizing circuit for the drive means for driving the reel coacting with said other wall end of the slot and the first sprocket in one direction, said driven reel thereby constituting the take-up reel and said first sprocket the take-up sprocket, the other reel and the second sprocket functioning as supply reel and supply sprocket, respectively, and setting of the control means into the reverse position closing an energizing circuit for the drive means for driving the reel coacting with said one wall end of the film and the sprockets in reverse direction, said reel and the second sprocket thereby now constituting the take-up reel and the take-up sprocket, respectively;

slip clutch means interposed between the drive means and the reel constituting the supply reel when the control means is set on forward and the take-up reel when the control means is set on reverse, said clutch means including friction members movable relative to each other between a slip position in which said members engage each other with a frictional grip braking the aforesaid reel but allowing slipping of said reel relative to the drive means in response to a pull of film travelling from said reel to the other reel and experiencing a pull above a predetermined value and a lock position locking the frictional members to each other with a frictional force preventing slipping of said reel relative to the drive means, and linkage means coupling the loading and threading means to the clutch means, said linkage means being controlled by the angular position of the loading and threading means and controlling the position of the friction members of the clutch means;

said linkage means coupling the loading and threading means to the clutch means comprising clutch setting means, said setting means being controlled by the setting of the loading an threading means and of the circuit control means, setting of the loading and threading means into the threading position and the circuit control means into the reverse position retaining the friction members of the clutch means in the slip position and setting of the loading and threading means into the loading position and the circuit control means into the reverse position releasing said friction members for movement into the lock position, said clutch setting means comprising bias means biasing the friction members of the clutch means toward the lock position, and cam means controlled by the position of the loading and threading means, said cam means retaining the friction members in the slip position when the loading and threading means are in the threading position and freeing the friction members for action by the bias means in response to placement of the loading and threading means in the loading position and the circuit control means in th reverse position.

11. The projector according to claim 10 wherein said cam means comprise a slanted camming surface and a cam follower, the position of the cam follower relative to the camming surface being controlled by the setting of the locking and threading means and controlling the relative position of the friction members, placement of the loadinj and threading means in the threading position retaining the cam follower in a position in which the friction members are held in the slip position against the action of said bias means and placement of the loading and threading means in the loading position moving the cam follower into a position in which the bias means are freed to move the friction members into the lock position.

12. A motion picture projector with self-threading mechanism, said projector comprising in combination:

an upright enclosure including in one of its outer walls a slot for insertion and removal of a length of film, said slot extending from one wall of the enclosure to another wall thereof, said one wall having an outwardly directed protrusion adjacent to the slot end in said one wall, said protrusion constituting a film guiding means for slidably guiding thereon a film portion in addition to the length of film insertable into the slot thereby extending the effective length of said slot;

a chassis stationarily mounted within said enclosure parallel to but spaced apart from said slotted wall;

a first sprocket rotatably mounted on said chassis, a second sprocket rotatably mounted on said chassis, either of said sprockets constituting a take-up sprocket or a supply sprocket, lower-loop-forming means mounted on said chassis pivotal between a loop-forming position and a retracted position, and an upper loop-forming means mounted on said chassis pivotal between a loop-forming position and a retracted position, said sprockets and said loop-forming means being on the chassis side facing said slotted wall and a film holding means including a stationarily mounted film channel;

film loading and threading means pivotally supported by said one wall of the enclosure, said loading and threading means being pivotal between a first limit position constituting the film threading position;

a first locking means movable between an inactive position and a locking position for locking a portion of film within the slot to the first sprocket, a second locking means movable between an inactive position and a locking position for locking a portion of film within the slot to the second sprocket, said second locking means including a first pressure means supported on said locking and threading means for pivotally moving in unison therewith, a first actuating means for moving the lower loop-forming means from the loop-forming position to the retracted position, a second activating means for moving the upper loop-forming means from the loop-forming position to the retracted position and a second pressure means movable into and out of a pressure position holding film extending between said pressure means and the channel in the latter; and linkage means operatively coupling said first and second locking means, said first and second activating means and said second pressure means to said loading and threading means for sequential operating of the locking means, the activating means and the second pressure means, pivoting of said loading and threading means from the loading position through a first predetermined angle operating the first locking means for locking the respective film portion to the first sprocket, pivoting of said means through a second predetermined angle operating the first actuating means for moving the lower loop-forming means into the retracted position, pivoting of said means through a third predetermined angle operating the second activating means for moving the upper loop-forming means into the retracted position, pivoting of said means through a fourth predetermined angle causing the first pressure means on said loading and threading means to slide the film portion guided on said protrusion into the slot and locking said film portion to the second sprocket and pivoting of said means through a fifth predetermined angle moving said second pressure means into the position holding the film in the channel, said fifth angular movement of the loading and threading means placing the same in the second limit position;

a pair of reels rotatably supported by said one wall of the enclosure, each of said reels being arranged to function either as take-up reels or as supply reels, one of said reels coacting with said one end and the other reel coacting with said other wall end of the slot, a reversible electric drive means for driving either one of said reels and both sprockets in either direction, and a circuit control means, said control means being selectively settable into an OFF position, a forward position and a reverse position, setting of the control means into the forward position closing an energizing circuit for the drive means for driving the reel coacting with said other wall end of the slot and the first sprocket in one direction, said driven reel thereby constituting the take-up reel and said first sprocket the take-up sprocket, the other reel and the second sprocket functioning as supply reel and supply sprocket, respectively, and setting of the control means into the reverse position closing an energizing circuit for the drive means for driving the reel coacting with said one wall end of the slot and the sprockets in reverse direction, said reel and the second sprocket thereby now constituting the take-up reel and the take-up sprocket, respectively; and a rotary cam means coupled to said film loading and threading means, said rotary cam means acting upon said circuit control means to operate the same for opening said energizing circuit for the drive means when said control means is in the reverse position and the loading and threading measn is moved into a position intermediate its limit positions thereby stopping the drive means to prevent damage to the film by rotation of the first and the second sprocket.

13. The projector according to claim 12 and comprising a projection light source connected in a circuit with said energizing circuit and controlled by the setting of the control means, setting of the control means either in the forward position of the reverse position closing the energizing circuit for the light source, said cam means further controlling the circuit for the light source when the control means is in the reverse position and the loading and threading means in an intermediate position to protect the film against burning when the film is stationary due to placement of the loading and threading means in the intermediate position.

14. In a motion picture projector with self-threading mechanism including an enclosure having in one of its outer walls a slot for insertion and removal of a length of film, a first sprocket and a second sprocket, either sprocket being operable as supply sprocket or as take-up sprocket, locking means for locking film inserted into the slot to said sprockets, means for forming an upper loop and a lower loop, and pivotal loading and threading means for sequentially activating the locking means for locking film to said sprockets and the loop-forming means for forming the upper loop and the lower loop by pivoting said loading and threading means from a loading position to a threading position, the improvements comprising a protrusion upwardly extending from an enclosure wall adjacent to one end of said slot for guiding film over said protrusion prior to entering said slot end, and locking means on said loading and threading means engaging film guided over said protrusion upon pivoting of the loading and threading means into the threading position, said engagement guiding a portion of film guide on said protrusion into the slot thereby correspondingly increasing the length of film within the slot.

* * * * *

UNITED STATES PATENT OFFICE
CERTIFICATE OF CORRECTION

Patent No. 3,848,981          Dated November 19, 1974

Inventor(s) Conkling Chedister et al.

It is certified that error appears in the above-identified patent and that said Letters Patent are hereby corrected as shown below:

Column 13, line 32, delete the word "one".

Column 18, line 51, after "position" should read:

--- constituting the film loading position and a second position ---.

Signed and Sealed this fifth Day of July 1977

[SEAL]

Attest:

RUTH C. MASON
*Attesting Officer*

C. MARSHALL DANN
*Commissioner of Patents and Trademarks*